United States Patent
Linkous et al.

(10) Patent No.: US 10,033,611 B1
(45) Date of Patent: Jul. 24, 2018

(54) TRANSACTION LIFECYCLE MANAGEMENT

(71) Applicant: HCA Holdings, Inc., Nashville, TN (US)

(72) Inventors: Kevin Ronald Linkous, Thompsons Station, TN (US); Alan Scott, Franklin, TN (US); Ryan Staggs, Brentwood, TN (US); Lars Söderkvist, Nashville, TN (US); William Landon Barnickle, Nashville, TN (US); Scott A. Southworth, Antioch, TN (US); Shannon Dewayne Dickens, Nashville, TN (US)

(73) Assignee: HCA Holdings, Inc., Nashville, TN (US)

( * ) Notice: Subject to any disclaimer, the term of this patent is extended or adjusted under 35 U.S.C. 154(b) by 127 days.

(21) Appl. No.: 15/015,597

(22) Filed: Feb. 4, 2016

Related U.S. Application Data

(60) Provisional application No. 62/113,154, filed on Feb. 6, 2015.

(51) Int. Cl.
*H04L 12/26* (2006.01)
*H04L 12/24* (2006.01)
(Continued)

(52) U.S. Cl.
CPC .......... *H04L 43/0876* (2013.01); *H04L 41/22* (2013.01); *H04L 41/5019* (2013.01);
(Continued)

(58) Field of Classification Search
CPC ....... H04L 51/30; H04L 51/34; H04L 51/046; H04L 41/5064; H04L 67/2804;
(Continued)

(56) References Cited

U.S. PATENT DOCUMENTS

| | | | | |
|---|---|---|---|---|
| 6,484,196 B1 * | 11/2002 | Maurille | ............ | H04L 12/1831 370/260 |
| 2002/0184354 A1 * | 12/2002 | McKenzie | .......... | H04L 41/5064 709/223 |

(Continued)

OTHER PUBLICATIONS

U.S. Appl. No. 15/670,932, filed Aug. 7, 2017, First Action Interview Pilot Program Pre-Interview Communication dated Oct. 30, 2017, all pages.
U.S. Appl. No. 15/670,932, filed Aug. 7, 2017, Notice of Allowance dated Jan. 10, 2018, all pages.

*Primary Examiner* — Jungwon Chang
(74) *Attorney, Agent, or Firm* — Kilpatrick Townsend & Stockton LLP

(57) ABSTRACT

A transaction management platform is provided that is configured to perform end-to-end tracking of transactions including messages. The messages are tracked using unique message identifiers that are generated and associated with messages. The unique message identifiers operate as pointers to allow the transaction management platform to monitor the messages. The transaction management platform also includes a plurality of engines and/or services to enable generation of a variety of different graphical diagrams. The graphical diagrams illustrate features such as, for example, component health, message volume, reconciliation, and other similar features.

20 Claims, 26 Drawing Sheets

(51) Int. Cl.
*H04L 29/08* (2006.01)
*H04L 12/58* (2006.01)
*G06Q 50/00* (2012.01)
*G06Q 10/10* (2012.01)

(52) U.S. Cl.
CPC .......... *H04L 43/10* (2013.01); *H04L 67/1095* (2013.01); *G06Q 10/10* (2013.01); *G06Q 50/01* (2013.01); *H04L 51/04* (2013.01); *H04L 51/28* (2013.01); *H04L 51/32* (2013.01); *H04L 51/34* (2013.01)

(58) Field of Classification Search
CPC . H04L 43/0876; H04L 43/10; H04L 41/5019; H04L 41/22; H04L 51/32; H04L 51/04; H04L 51/28; H04L 67/1095; G06F 19/322; G06F 19/328; G06F 19/3418; G06F 19/327; G06F 17/21; G06F 50/01; G06F 10/10; G06Q 50/24; G06Q 50/22
USPC ..... 709/207, 223, 224, 205–206; 455/414.1; 705/2–3; 715/234; 370/260
See application file for complete search history.

(56) References Cited

U.S. PATENT DOCUMENTS

| | | | |
|---|---|---|---|
| 2006/0129650 A1* | 6/2006 | Ho | H04L 67/2804 709/207 |
| 2009/0138282 A1* | 5/2009 | Lee | G06F 19/322 705/3 |
| 2010/0114602 A1* | 5/2010 | Joao | G06F 19/322 705/2 |
| 2012/0231770 A1* | 9/2012 | Clarke | H04L 51/34 455/414.1 |
| 2013/0268839 A1* | 10/2013 | Lefebvre | G06F 17/21 715/234 |
| 2014/0129238 A1* | 5/2014 | Gray | G06Q 50/24 705/2 |
| 2014/0280609 A1* | 9/2014 | Averbeck | H04L 51/34 709/206 |
| 2015/0088999 A1* | 3/2015 | Carr | H04L 51/30 709/206 |

* cited by examiner

| Created | Source App | Facility | Msg Type | MCID | @Src | @CL |
|---|---|---|---|---|---|---|
| 2014-08-26 00:00:00 | MT | COCGBT | ADT | GOPHSS.1.742027 | Y | |
| 2014-08-26 00:00:00 | MT | COCGO | ADT | GOPHSS.1.399518 | Y | |
| 2014-08-26 00:00:00 | MT | COCGBT | ADT | GBTGTADM.1.9669198 | Y | |
| 2014-08-26 00:00:00 | MT | COCGO | ADT | GBTPHSS.1.742028 | Y | Y |
| 2014-08-26 00:00:00 | MT | COCGBT | ADT | GOPHSS.1.399519 | Y | |
| 2014-08-26 00:00:00 | MT | COCGBT | ADT | GBTGTADM.1.9669199 | Y | Y |
| 2014-08-26 00:00:00 | MT | COCGO | ADT | GBTPHSS.1.742029 | Y | Y |
| 2014-08-26 00:00:00 | MT | COCGO | ADT | GOPHSS.1.399520 | Y | |
| 2014-08-26 00:00:00 | MT | CACGBT | ADT | GBTPHSS.1.742026 | Y | |
| 2014-08-26 00:00:00 | MT | COCGO | ADT | GOGTADM.1.14794698 | Y | Y |

FIG. 11

TRANSACTION LIFECYCLE MANAGEMENT

RELATED APPLICATIONS

The present application claims the benefit of priority of U.S. Provisional Application No. 62/113,154, filed on Feb. 6, 2015, the entire contents of which is hereby incorporated by reference.

BACKGROUND

This specification relates in general to transaction tracking and, but not by way of limitation, to transaction tracking within a network and presentation of results relating to transaction tracking.

The growth of networks, both private and public, has resulted in increasingly complex infrastructures that support communications within the networks. In an example network, in addition to the presence of end point nodes in the network, an underlying infrastructure can include many other nodes through which a transaction must travel on its path from an originating node to a destination node. The more nodes along its path, the more likely it is that the transaction will not reach its destination node. The reasons why it may not reach its destination node can be various. For example, the transaction may have an improper address or an intermediate node may be offline or not processing transactions appropriately. However, diagnosing the reason using conventional methods of transaction tracking may prove burdensome, time consuming, and/or impossible. This is especially true when the individual diagnosing lacks a first-hand understanding of the network and infrastructure.

BRIEF DESCRIPTION OF THE DRAWINGS

Various embodiments in accordance with the present disclosure will be described with reference to the drawings, in which:

FIG. 11 is an example data table including information relating to implementing techniques relating to managing and tracking transactions within a network as described herein, according to at least one example;

DETAILED DESCRIPTION

Figure 1:
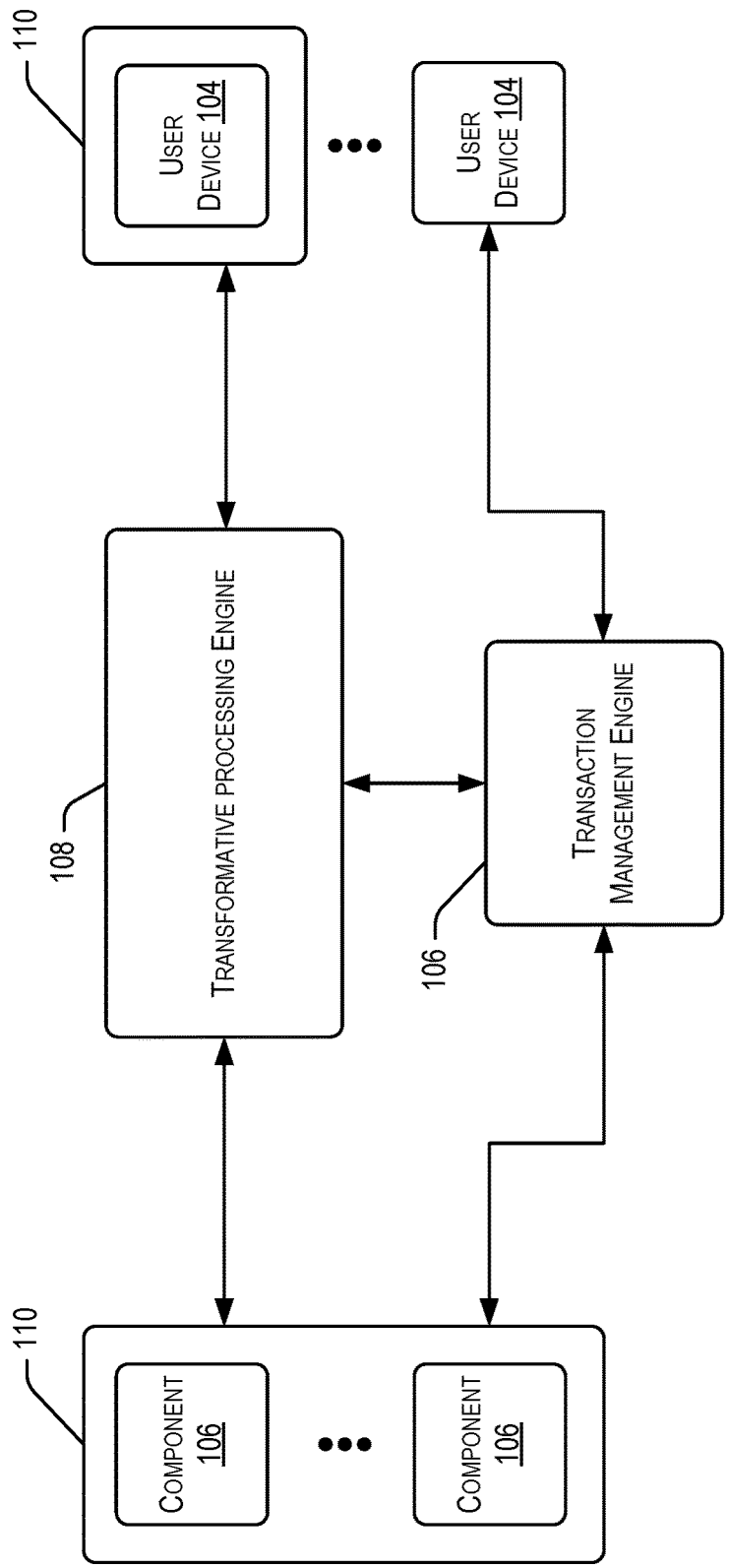
FIG. 1. is an example block diagram illustrating an environment in which techniques relating to managing and tracking transactions within a network as described herein may be implemented, according to at least one example.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one example, a method and system for tracking message transactions is provided. The messages represent a variety of different types of digital messages that may be transferred between nodes of a network. Each message that is transferred within the network may constitute a single transaction. The flow of each transaction is tracked from its originating node to its destination node and at all points in between. This tracking is performed in part by a transaction management engine. The transaction management engine is located within the network between originating nodes and destination nodes. In some examples, the transaction management engine is coupled with a transformative integration engine or a similar engine that aggregates messages. In some examples, the transaction management engine is included as part of a stand-alone transaction management platform. In any event, once the transaction management engine receives the message or an indication of the message, the transaction management engine generates a unique message identifier. The unique message identifier may comprise a source application identifier, a source facility identifier, a message type identifier, a message control identifier, any other suitable identifier. The unique message identifier is then associated with the message via metadata (e.g., within the header of the message) such that when the next node (e.g., component, device, server, etc.) receives the message, that node can report back to the transaction management engine that the message has been received. Each node that receives the message can send a ping back to the transaction management engine.

In one example, message tracking information generated by a transaction management engine is displayed using an interactive visualization engine. The interactive visualization engine receives message tracking information and causes it to be displayed. In some examples, the message tracking information is provided using one or more data service layers that may or may not be in communication with the interactive visualization engine. Display of the message tracking information includes providing a graphical diagram for presentation on a user interface and dynamically adjusting the presentation of the graphical diagram to illustrate the movement of messages throughout a network and to illustrate the functional health of components (represented as nodes) of the network. The graphical diagram, therefore, includes a plurality of nodes of the network connected with variably-sized chords connecting at least two nodes of the plurality. In some examples, the variably-sized chords represent the movement of messages between the nodes of the network. The width of a chord between two particular nodes depends on the number of messages that are represented by the nodes over a given time period. For example, when two nodes represent actual physical facilities or components, the width of the chord may depend on the number of messages flowing between the two nodes. However, when one node represents a facility and the other node represents a message type, the width of the chord connecting the two nodes may depend on the number of messages of the message type that flow into and/or out of the facility. The nodes and the chords of the interactive visualization are refreshed automatically and/or by user initiation. A user of the interactive visualization can filter the message tracking information based on message type, source application, source facility, and other parameters of the messages and can drill down to different levels of granularity within the information and over different time frames.

In one example, a reconciliation engine is provided that enables reconciliation of messages. Reconciliation of messages may be desirable in a network to identify the reasons why messages are not moving properly throughout the network. For example, messages may be held up in a cache of a node, negatively acknowledged by a node, and many other reasons. By accessing the unique message identifiers and, in some examples, other information output by the transaction management engine and information received from destination nodes, the reconciliation engine is able to determine which messages did not make it to their respective destination nodes. The information received from the destination nodes may act as a confirmation that the messages were not lost or corrupted prior to delivery to the destination nodes. In some examples, the reconciliation engine assigns a status to each message which may include: not reconciled, waiting for reconciliation, reconciled, negatively acknowledged, acknowledged, combinations of the foregoing, and other suitable statuses. Using the reconciliation engine, a case can be created and provided to a user for further exploration. The case may include a list of messages, their status, and other suitable information. Any of the data generated by the reconciliation engine may be provided for presentation on a user interface. The user interface may include filters, menus, and the like to interact with the data gathered by the reconciliation engine.

In one example, message tracking information generated by a transaction management engine is used to track latency of messages as the messages travel through a network. In this example, the message tracking information is used to drill down to the message level. Thus, a user may use the message tracking information to identify details about particular messages. For example, tracking information relating to discharges of users may be collected and analyzed to determine whether care was provided in a timely manner. Because the messages can correspond to actual events relating to the user (e.g., discharge of a user), the tracking of messages in this example can be used for service level agreement compliance.

In one example, message tracking information is used by an anomaly detection engine for anomaly detection. In this example, the message tracking information is monitored in combination with mathematical formulas to determine if an appropriate amount of data is flowing through a network given a certain period of time. The appropriateness of the amount of data is determined by comparing what should have been received (based on historical trends) with what has actually been received. The data is represented by the messages which carry the data. In one example, based on historical trends, for a period beginning at 12:00 am on Monday and ending at the current time (e.g., 12:00 pm) on the same day, a particular component of the network is expected to receive 10,000 messages of type A from location X. By analyzing the message tracking information, it may be determined that only 8,000 messages were received. Using this comparison, the system may identify anomalies within the system, whether the anomaly be a particular node, network, or the like. The historical data that is used is specific to the time period of interest. Thus, in the example above, the historical data for the 12-hour time period is the historical data for that same 12-hour time period going back a predetermined number of weeks, months, or years. This historical data is calculated to determine an arithmetic average number of messages which can be used to compare with the current number of messages. This provides rolling anomaly detection that improves as the data becomes more rich. The interactive visualization engine receives message tracking information output by the anomaly detection engine and provides a graphical diagram for presentation on a user interface. The graphical diagram includes nodes and chords. In some examples, the amount of messages is compared to one or more thresholds to determine how threads that represent the messages should be shaded and/or colored. For example, yellow may indicate that the number of messages is a little low, red may indicate that the number of messages is zero, blue may indicate that the number is close to normal, and purple may indicate that the number is more than expected.

In one example, the technical health of components of a network is monitored by a health monitor engine. The health monitor engine determines health information which represents the "health" of components based at least in part on message tracking information. Once the health information is determined, the interactive visualization engine provides a graphical diagram for presentation on a user interface. The graphical diagram provides a visualization of how the health of the components compare to other components, and to baselines of health for the particular component. In some examples, the graphical diagram provides the health of components configured to integrate data (e.g., enterprise-level integration platforms). The health monitor engine may be configured to monitor one or more operational characteristics of components to determine the health information corresponding to the components. For example, the health monitor engine may monitor indications of fragments, suspended instances, suspended messages, and any other suitable operational characteristic. The messages that correspond to the monitored operational characteristics can be accessed in the graphical diagram and may be filtered by message type (e.g., pharmacy, clinical, etc.), origination location, origination system, and any other suitable filter criterion. In some examples, the health information is presented in a histogram and/or colored and/or shaded using thresholds. Using the health monitor engine may enable a user to see health of components and/or message volume health irrespective of the platform or operating system from which the messages originated. If the user identifies a problem, the user can click on a node that represents the component, and the user is directed to the necessary screen for beginning to resolve the problem.

In one example, message tracking information generated by a transaction management engine is displayed for identifying messages that may be affected. The graphical display of these affected messages is refreshed on a near real-time or real-time basis. In some examples, the graphical display is a zoomable heat map that includes one or more boxes representative of message types, origination location, or any other suitable characteristic. The size of the boxes depends on the number of affected messages, the size of the boxes is relative to the other boxes being presented. In addition, the color, shading, fill, intensity of colors, or otherwise of the boxes can change depending on the percentage of effected messages. The diagram can also be filtered by latency and other filters to display other helpful information. Because the number of and percentage of messages is presented, the areas that need to be addressed by an authorized user are automatically prioritized. Based on this, the user can quickly and efficiently determine where to focus recovery efforts.

Referring first to FIG. 1, a block diagram of an embodiment of an interaction system 100 is illustrated. Generally, in interaction system 100, data can be generated at one or more system components 102 and/or user devices 104. Transaction management engine 106 van manage the flow of communications within interaction system. Transformative processing engine 108 can receive, intercept, track, integrate, process and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102 and/or data in a corresponding communication received from a user device.

As another example, a user device 104 can be configured to detect user input received at a user interface of the device. The user input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect user input requesting particular data, to generate a request communication (e.g., to be sent to transformative processing engine), to receive the requested data and/or to present the received data.

Data can include information that identifies a person, such as personal information and/or demographic information. For example, the information can identify a person's name, age, sex, race, physical address, phone number, email address and/or social security number. Data may include information collected by a government agent, employer, insurer, or school or university, that relates to a past, present, or future condition or status (e.g., pertaining to employment, political involvement, occupation, health, or financial status) of any individual. For example, data may include information about past events.

Data may identify an entity being evaluated and/or one at least partly performing an evaluation. For example, a communication may identify a first company as one being evaluated and a second company as one evaluating a quality of a product of the first company. As another example, a communication may identify a first service plan of a first company as one providing an Internet network and may identify one or more users providing speed checks over the network.

The depicted engines, devices and/or components can communicate over one or more networks. A network of one or more networks can include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or transaction management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or processing focus. Exemplary types of facilities include server farm facilities, web-server facilities, data-storage facilities, technical-support facilities, telecommunication facilities, care facilities and/or business operation facilities. For example, a first facility may include a structure at a first location at which one or more resources (e.g., computational resources, equipment resources, laboratory resources and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another examples, different facilities may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client or receiving a service from the client.

In some examples, one or more components 102 and one or more user devices 104 may communicate with transformative processing engine 108 and transaction management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., transaction management engine 106, an entity device and/or a user device) and/or locally or remotely stored. In some examples, transformative processing engine 108 receives data in a particular format (e.g., the HL7 format) or conforming to any other suitable format and/or is configured to transform received data to conform with the particular format.

One or more components 102 of facility 110 can include and/or has access to a local or remote memory for storing generated data. In some examples, the data is stored by one or more servers local to facility 110. Such storage may enable facility 110 to retain locally data pertaining to its facility prior to (or in conjunction with) the data being shared with transformative processing engine 108 and/or transaction management engine 106. In some examples, the one or more servers of facility 110 share data directly with a record service (not shown), and the record service makes the data available to transformative processing engine 108 and/or transaction management engine 106. Once an electronic record is updated at facility 110, an indication of the update may be provide to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from an component (or facility), the record service can identify a corresponding record and update the record to include the data (or processed version thereof). In some examples, the record service provides data to transformative processing engine 108.

Facility 110 can include one at which a resource is located and/or service is provided. Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private and/or proprietary network or protocols. The use of one or more private and/or proprietary protocols can promote secure transfer of data.

Figure 2:
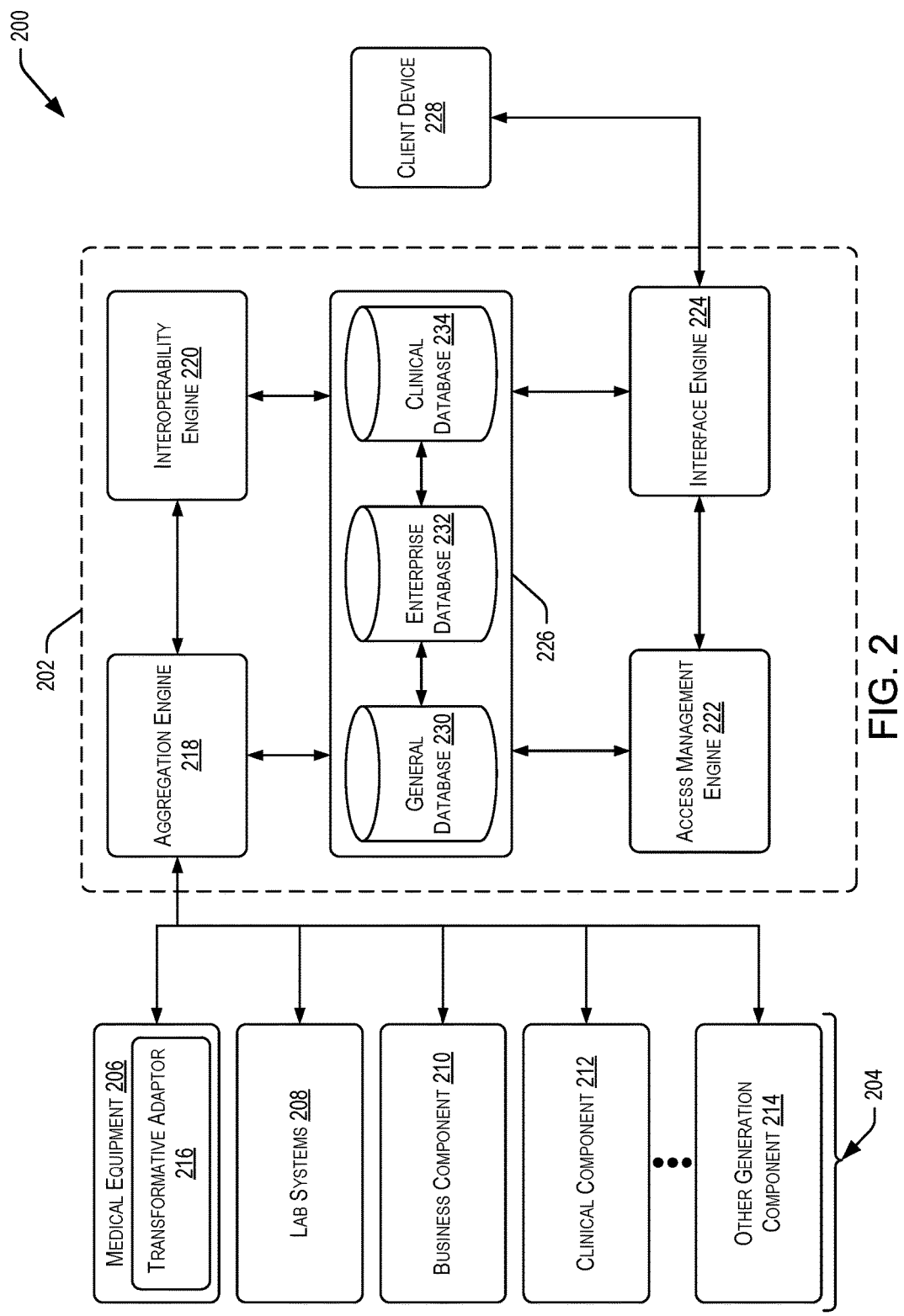
FIG. 2. is an example block diagram illustrating an environment in which techniques relating to managing and tracking transactions within a network as described herein may be implemented, according to at least one example.

Referring next to FIG. 2, a block diagram of an example of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 includes an equipment component 206, a lab systems component 208, a scheduling component 210 and other generation component 212. One or more generation components 204 are examples of one or more components 102 discussed with reference to FIG. 1.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design—making large amounts of data, in many different originating formats available to various types of users, via one or more interfaces.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Scheduling component 210 includes any suitable computing devices used for business-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, have paid a subscription fee associated with access to data store 226, and the like. Access management engine 222 may also verify that the user device 228 has an IP address or geographical location that corresponds to an authorized list, that the user device 228 includes a plug-in for properly accessing data store 226, that the user device 228 is running certain applications required to access data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

Figure 3:
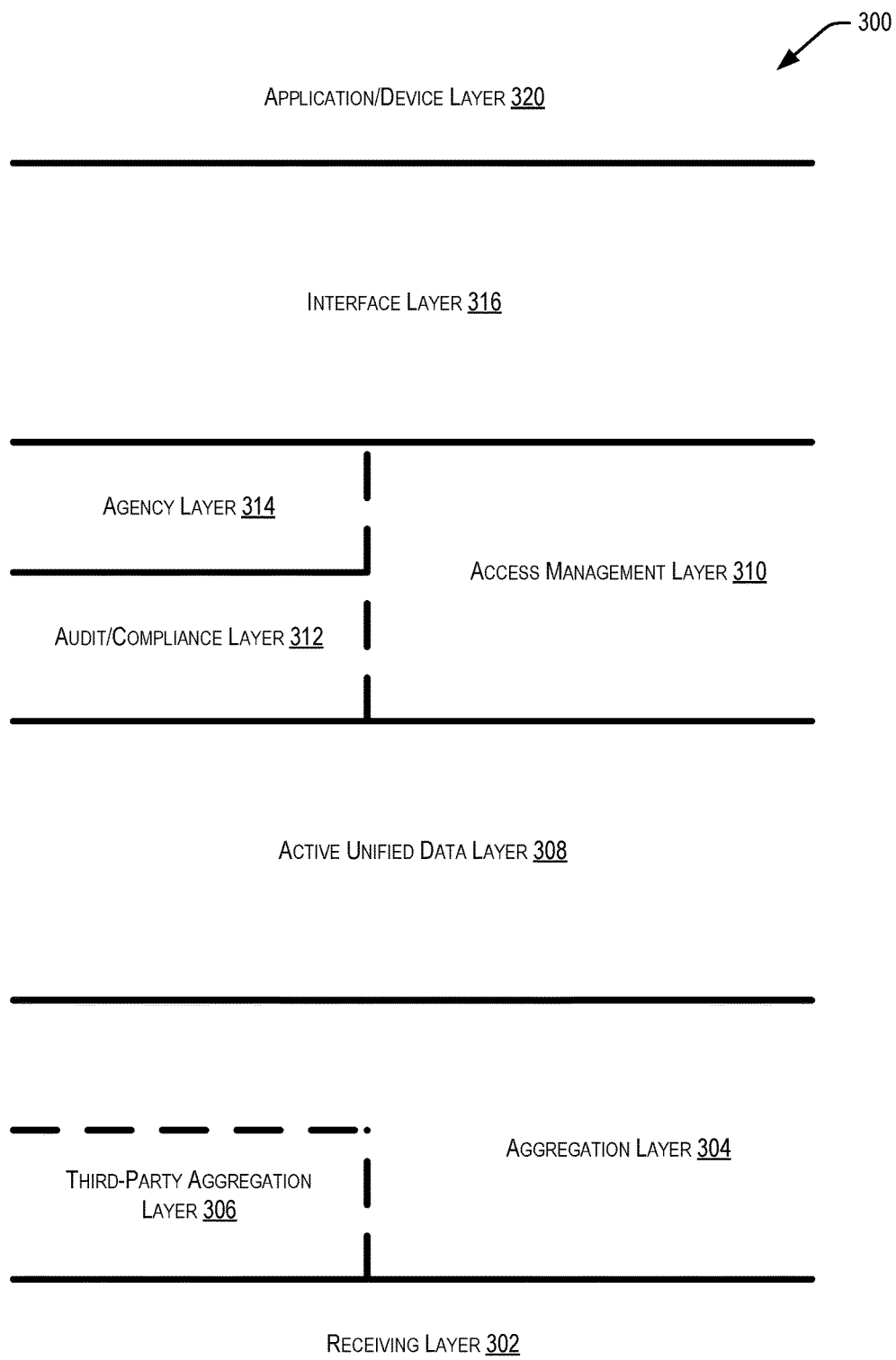
FIG. 3 is an example schematic model illustrating an a network communication model in which techniques relating to managing and tracking transactions within a network as described herein may be implemented, according to at least one example.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components 302 that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties.

Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
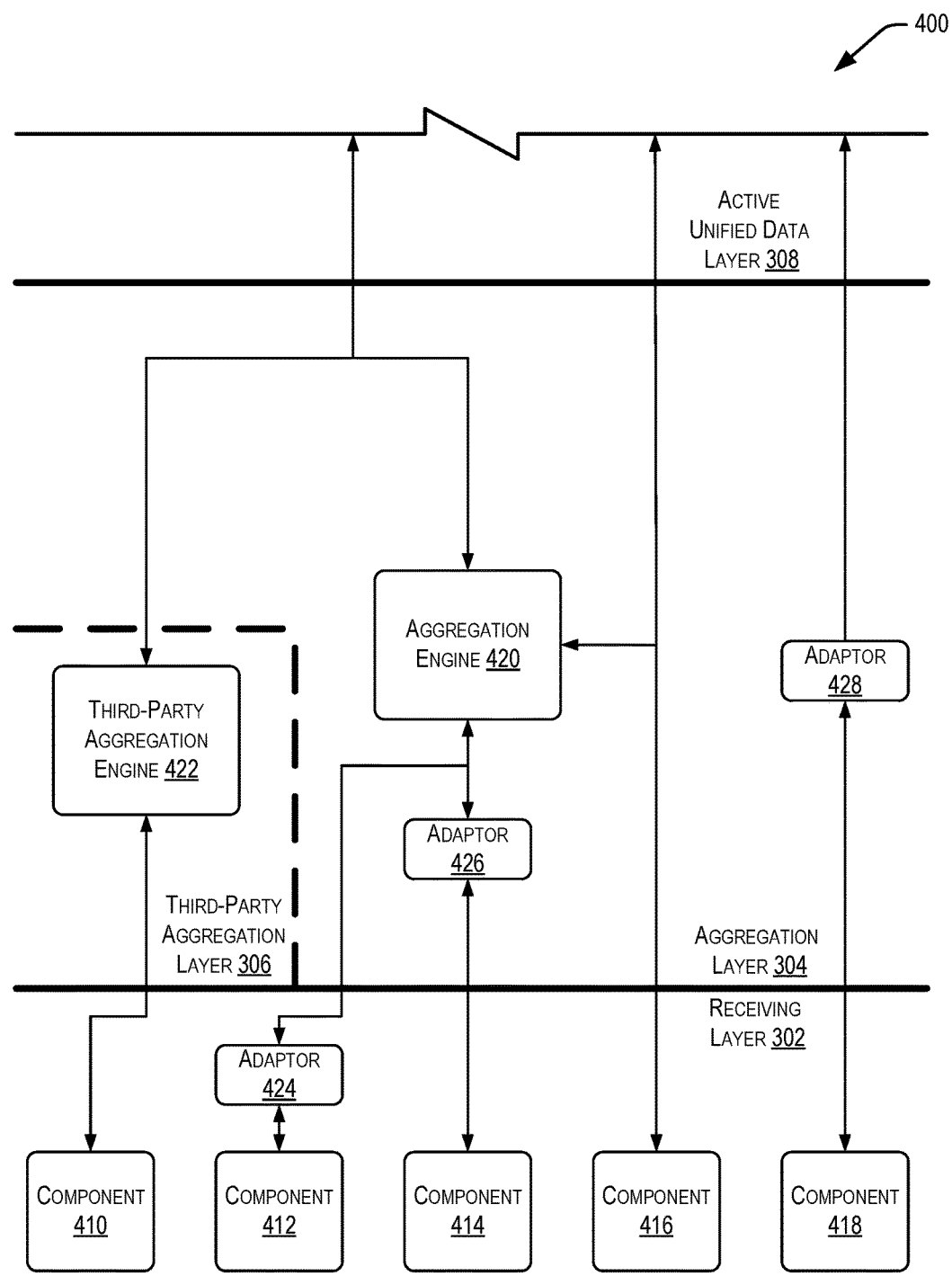
FIG. 4 is an example schematic model illustrating an aspect of the network communication model of FIG. 3 in more detail.

Turning next to FIG. 4, a diagram 400 is shown that depicts a portion of architecture stack 300 according to an embodiment of the invention. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

Figure 5:
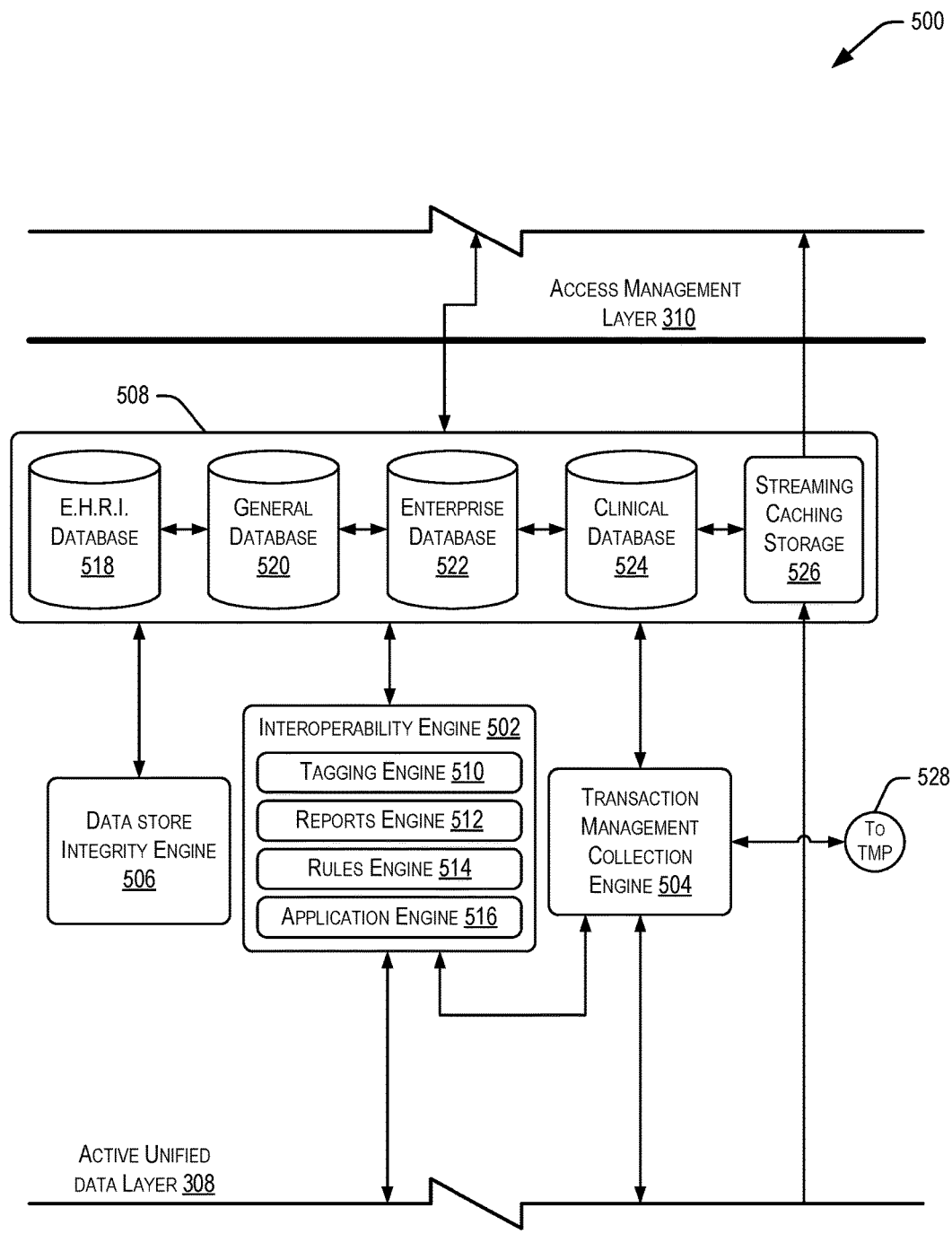
FIG. 5 is an example schematic model illustrating an aspect of the network communication model of FIG. 3 in more detail.

Referring next to FIG. 5, a diagram 500 is shown that depicts a portion of architecture stack 300 according to an embodiment of the invention. In particular, diagram 500 includes active unified data layer 308 and a portion of access management layer 310. Active unified data layer 308, as illustrated in diagram 500, includes an interoperability engine 502 (e.g., interoperability engine 220), a transaction management collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Transaction management collection engine 504 is implemented as part of transaction management engine 106. Transaction management collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304. The table may be stored in association with the transaction management platform 528.

In some examples, the table also includes information for tracking the progress of the message from an origination node to a destination node. For example, typically when a message (e.g., any communication of data) is first received by transformative processing engine 108 (e.g., interoperability engine 502), transaction management engine 106 (e.g., transaction management collection engine 504 of transaction management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to transaction management engine 106 that it saw the message. In this manner, transaction management engine 106 may enable end-to-end tracking of messages for the life of the message.

In one example, the messages are requests. The requests may be generated based on user input at one of the components. The requests may be received by transformative processing engine 108 and integrated into the system. In some examples, transaction management engine 106 may be notified that the requests have been received and may therefore be configured to generate message IDs for each request. These message IDs may then be associated with each of the requests. As the requests continue to move throughout the interaction system (e.g., away from transformative processing engine 108), transaction management engine 106 may be track their movement using the message IDs. If one of the requests does not make it to its destination, transaction management engine 106 (or part of the transaction management platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, transaction management engine 106 (e.g., transaction management collection engine 504 of transaction management engine 106) may receive the message and/or message identifier directly from one of components 410-418. For example, one of components 410-416 may be configured to generate the unique message identifier and/or communicate directly with transaction management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, transaction management collection engine 504 provides unique message identifiers to other elements of the interaction system to monitor the messages as they move throughout the interaction system. Transaction management collection engine 504 also provides a portion of the unique message identifiers to a transaction management platform (indicated by a circle 528) for further analysis of the message identifiers. Such analysis may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage business rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

[Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. F2. In some examples, the operational data ware house 522 includes data pertaining to decision making as discussed herein and other data typically used by conventional business concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of personal record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
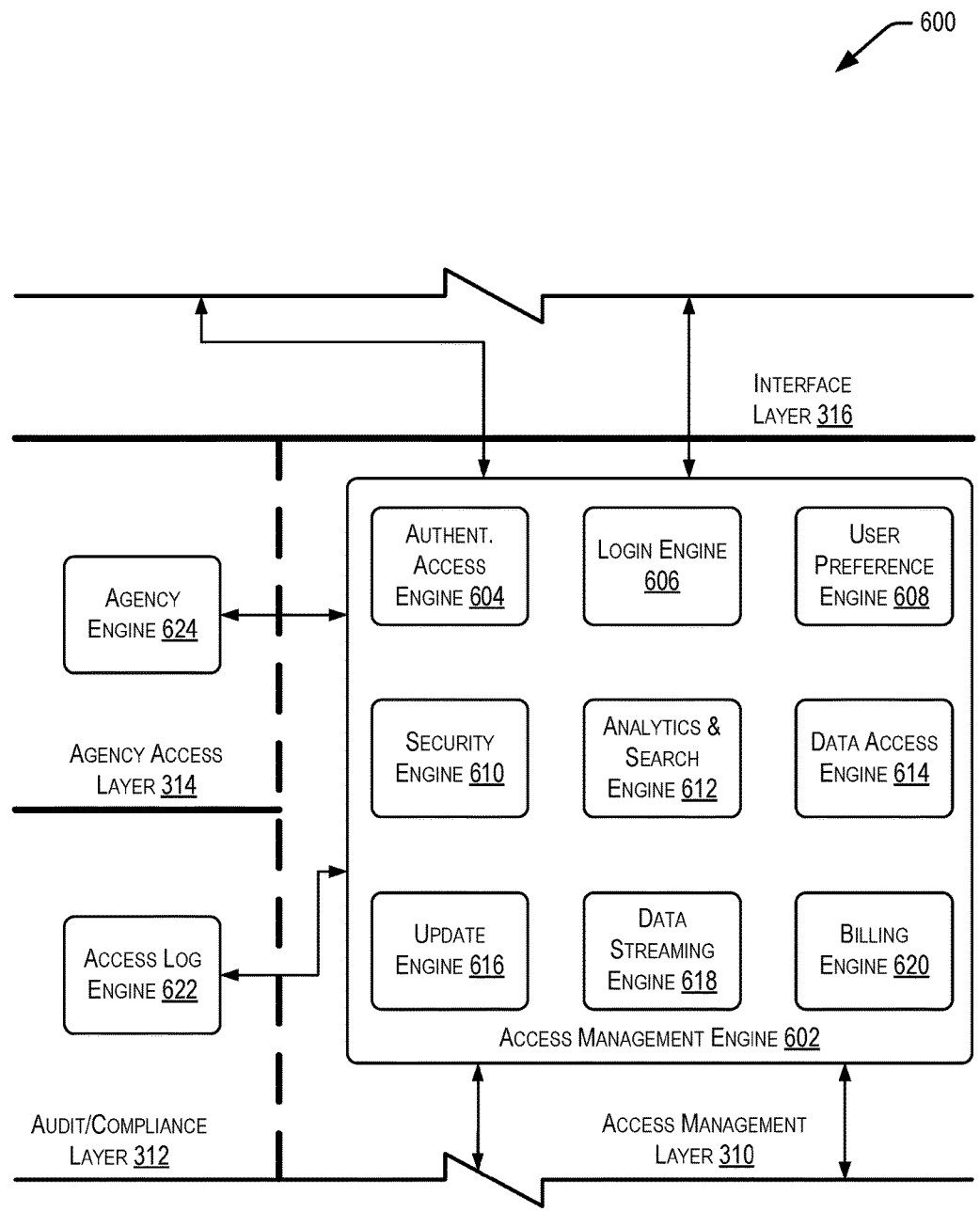
FIG. 6 is an example schematic model illustrating an aspect of the network communication model of FIG. 3 in more detail.

FIG. 6 shows a diagram 600 which depicts a portion of architecture stack 300 according to an embodiment of the invention. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
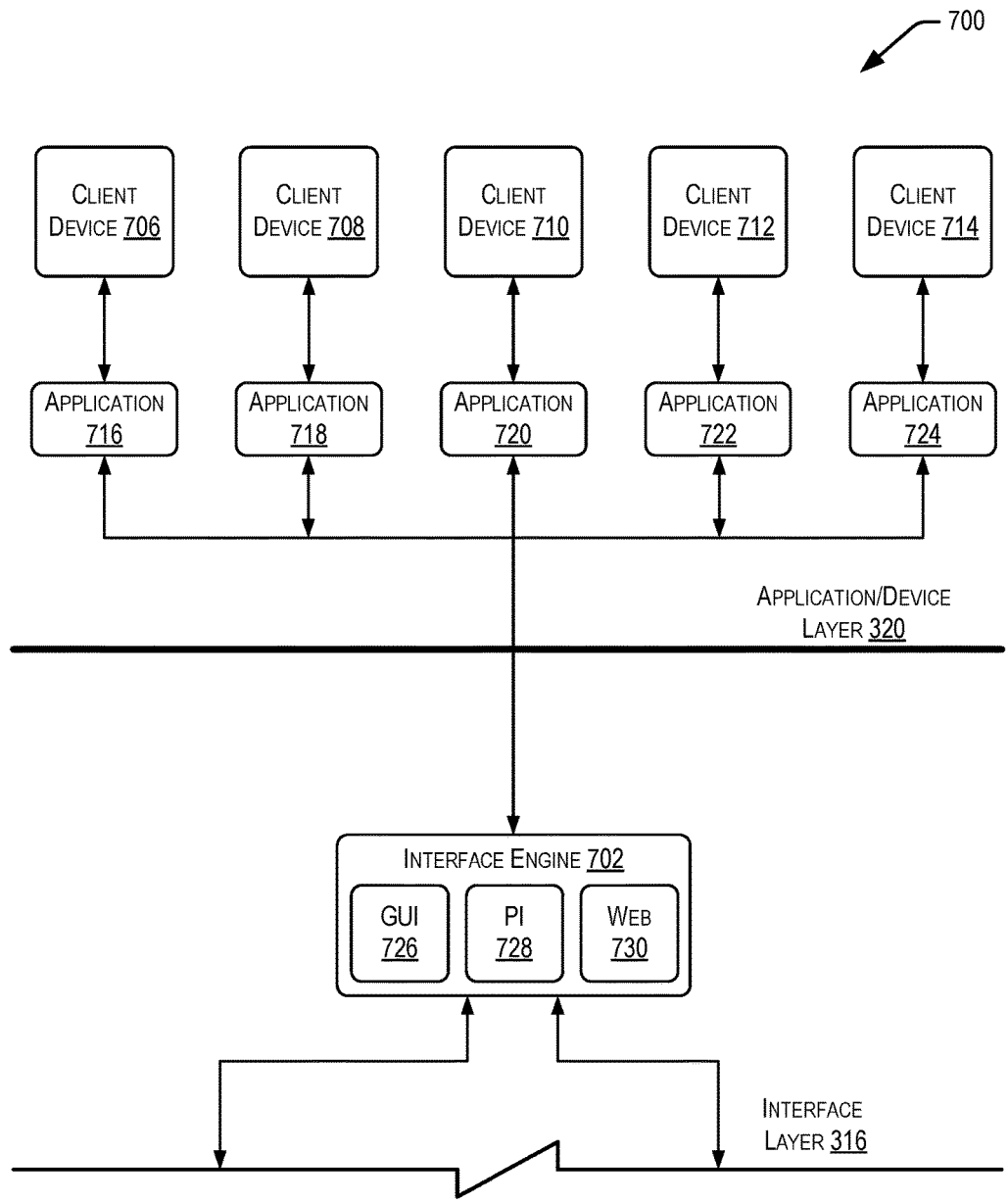
FIG. 7 is an example schematic model illustrating an aspect of the network communication model of FIG. 3 in more detail.

FIG. 7 shows a diagram 700 which depicts a portion of architecture stack 300 according to an embodiment of the invention. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unpromopted alerts, adjust display of content, move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the doctor, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be a business intelligence application. In this example, application 724 is used to display business information generated by components of the interaction system. This business information can be used for operations, planning, and forecasting. Such business information may include data because such data may impact operations, planning, forecasting, and the like. Accordingly, application 724 may present de-identified information in the form of one or more metrics, indicators, or the like as they pertain to business intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
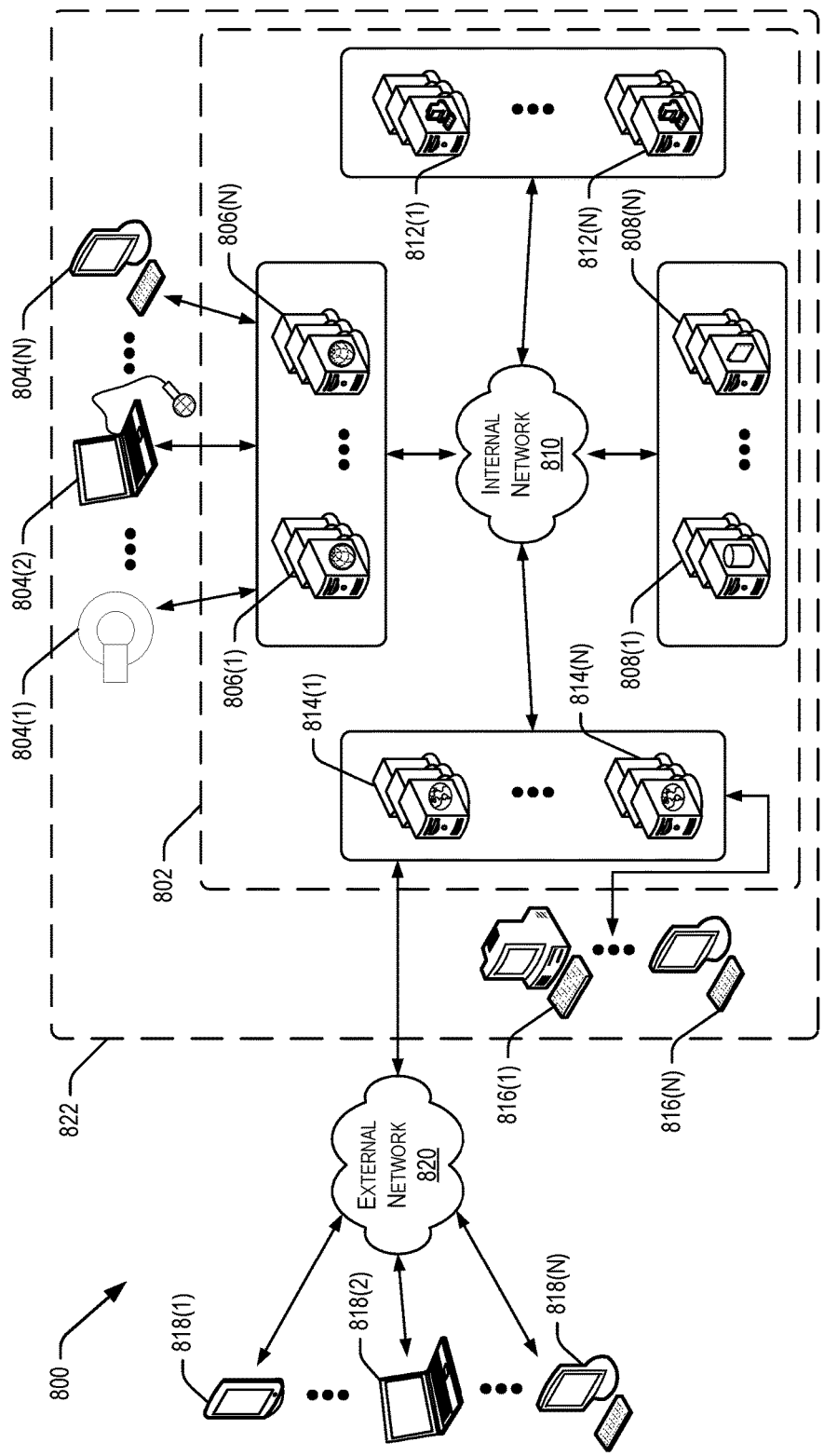
FIG. 8 is an example schematic architecture illustrating a network in which techniques relating to managing and tracking transactions within a network as described herein may be implemented, according to at least one example.

Turning now to FIG. 8, an interaction system 800 is shown in accordance with an embodiment of the invention. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N)

are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Figure 9:
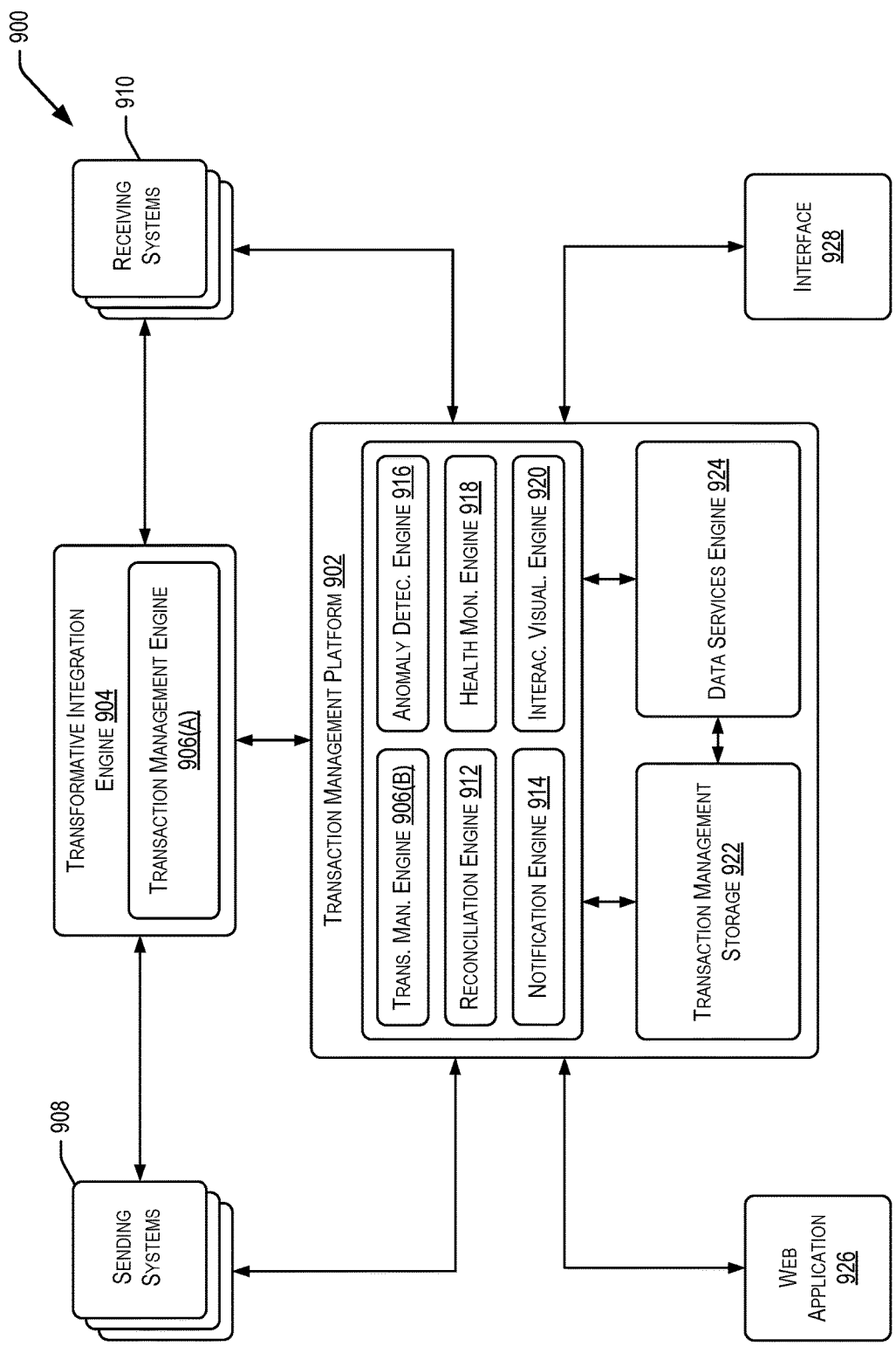
FIG. 9 is an example block diagram illustrating an environment in which techniques relating to managing and tracking transactions within a network as described herein may be implemented, according to at least one example.

FIG. 9 illustrates a block diagram of a message tracking architecture 900 in accordance with an embodiment of the invention. The message tracking architecture 900 includes the transaction management platform 902. The message tracking architecture 900 may be implemented using at least some of the elements of the network 800. For example, the transaction management platform 902 is an example of the transaction management platform 528 discussed herein. The message tracking architecture also includes transformative integration engine 904, which is an example of the transformative processing engine 108. The transformative integration engine 904 includes a transaction management engine 906(A). The transaction management platform 902 also includes a transaction management engine 906(B). The transaction management engines 906(A), 906(B) are examples of the transaction management engine 106 discussed herein. The transaction management engines 906(A), 906(B) are configured to track messages using unique message identifiers as discussed herein.

Sending systems 908 are configured to provide data to receiving systems 910. In some examples, the data moves in the form of one or more messages via the transformative integration engine 904 and/or the transaction management platform 902. The sending systems 908 include any suitable computing system used in a network to generate and/or process data. Examples of the sending systems 908 include clinical data systems, electronic medical record services, data centers, servers, computers, medical devices, and any other suitable component, such as the generation component 106 or the user device 104 capable of generating and/or processing data. In some examples, the elements of the transaction management platform 902 may be considered nodes of a network. In this example, the sending systems 908 may be considered source nodes and/or origination nodes. The sending systems 908 may be source nodes because data is originating at the sending systems 908 as it moves throughout the network.

The receiving systems 910 are configured to receive data from the sending systems 908. In some examples, the data is received via the transformative integration engine 904 and/or the transaction management platform 902. The receiving systems 910 include any suitable computing system used in a network to receive and/or process data. Examples of the receiving systems 910 include clinical data systems, electronic medical record services, data centers, servers, computers, medical devices, and any other suitable component, such as the generation component 102 or the user device 104 capable of receiving and/or processing data. In some examples, the elements of the transaction management platform 902 may be considered nodes of a network. In this example, the receiving systems 910 may be considered destination nodes or pathway nodes. The receiving systems 910 may be destination nodes at least because data is received by the receiving devices 910 as it moves throughout the network. The receiving systems 910 may be pathway nodes at least because medical related data is passed between some of the receiving systems 910 before ending at one or more of the receiving systems 910.

In some examples, the transformative integration engine 904 is an enterprise level integration engine and may be configured to receive data from a variety of different sources (e.g., the sending systems 908) and make such data available to other engines and services associated with the message tracking architecture 900. The transaction management engine 906(A) may be associated with the transformative integration engine 904 such that when the data (e.g., messages) is received by the transformative integration engine 904, the transaction management engine 906(A) may access that data to generate corresponding unique message identifiers for tracking the data (e.g., messages) within a network. The unique message identifiers, which may be referred to herein as message tracking information, may be provided to the transaction management platform 902. The transaction management platform 902 includes a variety of engines, services, and storage elements configured to track movements of messages, using the unique message identifiers, throughout a network.

The transaction management platform 902 includes the transaction management engine 906(B), a reconciliation engine 912, a notification engine 914, an anomaly detection engine 916, a health monitor engine 918, and an interactive visualization engine 920. In some examples, each of the engines of the transaction management platform 902 comprises software and/or hardware that is configured to implement the message tracking techniques described herein. The engines are provided as examples, and it is understood that more or fewer engines may perform the operations described herein. The transaction management engine 906(B) is configured to receive messages and/or indications of messages from the sending systems 908. In some examples, the transaction management engines 906(A) and 906(B) perform similar roles. In any event, once a message is received, the transaction management engine 906(B) generates a unique message identifier that is unique to the message. The unique message identifier may be a hexadecimal, hexadecimal, or any other suitable combination of letters, numbers, symbols, and the like.

The transaction management engine 906(B) generates a record for the message and associates the unique message identifier with the record and stores the record in the transaction management storage 922. As described in more detail herein, the record may include various types of data that are particular to the message. The transaction management storage 922 may include any suitable number of data stores or other suitable storage devices. The transaction management engine 906(B) also includes the unique message identifier with the message. This may include altering the message to include the unique message identifier. For example, the transaction management engine 906(B) may include the unique message identifier in the header of the message. Instructions may also be included in the header of the message in association with the unique message identifier. In some examples, the unique message identifier and/or the instructions may instruct later nodes to report back to the transaction management platform 902 once the message is received. For example, once a particular receiving system of the receiving systems 910 receives the message, the particular receiving system provides a message back to the transaction management platform 902. The transaction management platform 902 then updates the record associated with the message that is stored in the transaction management storage 922.

The reconciliation engine 912 is configured to generate data that can be used to help an administrator or other authorized user to reconcile lost messages, account for latency in messages as they move throughout a network, and any other suitable reconciliation process. In some examples, the reconciliation engine 912 generates a list of nodes that need to be reconciled. For example, some nodes may not be transferring information (e.g., messages). This list can be sorted and prioritized based on message type, date, location, application, etc. In this manner, an authorized user will be informed as to which nodes need the most immediate attention and which nodes can be dealt with another day.

The notification engine 914 is configured to generate notifications regarding the generation of unique message identifiers and tracking of messages. The anomaly detection engine 916 is configured to implement techniques related to anomaly detection as described herein. For example, the anomaly detection engine 916 may be configured to estimate an expected quantity of messages for a particular node. The anomaly detection engine 916 may therefore be configured to access historical data representative of historical message transactions. This historical data can then be used by the anomaly detection engine 916 to generate a baseline of how many messages, of what type, originating from which system and facility, and the like should be expected. The anomaly detection engine 916 may also be configured to monitor incoming messages, compare the quantity (and other characteristics) to the baseline, and determine whether the received/monitored messages are anomalous for a given time period.

The health monitor engine 918 is configured to monitor the health of components of the network. These components may include any suitable device of the network that is capable of sending and/or receiving data. In some examples, the health monitor engine 918 is configured to monitor the health of a few major components of the network. For example, the transformative integration engine 904 and other similar engines and/or devices may be monitored by the health monitor engine 918. Monitoring a component by the health monitor engine 918 may include monitoring operational characteristics of the component and alerting an authorized user when the operational characteristics exceed or drop below a threshold. The operational characteristics may relate to the messages and may be monitoring using the unique message identifiers.

The interactive visualization engine 920 is configured to generate one or more graphical diagrams that can be presented on user interfaces, such as interface 928. In some examples, the interactive visualization engine 920 generates graphical diagrams based on movements of messages within a network. For example, a graphical diagram may include a plurality of nodes connected with a plurality of chords. The color and intensity of the nodes and the chords may be adjusted based on changes tracked by one of the other engines of the transaction management platform 902. Any of the information generated by the transaction management platform 902, including any output, may be provided to the interface 928 and/or web application 926.

The transaction management platform 902 may also include a data services engine 924. The data services engine 924 may be configured to provide one or more services in a service-oriented architecture. For example, the data services engine 924 may enable other components to access to the transaction management platform 902.

Figure 10:
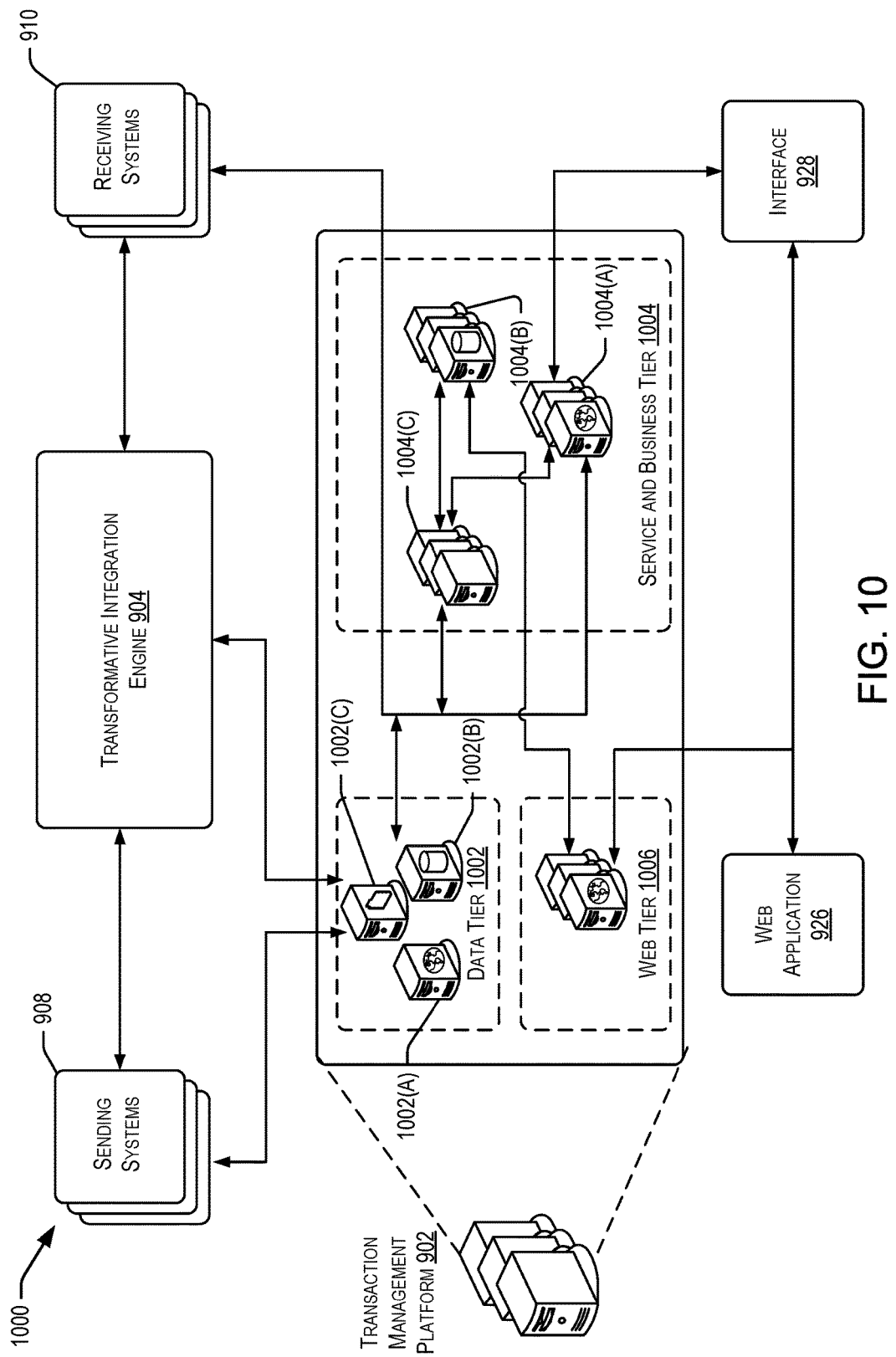
FIG. 10 is an example block diagram illustrating an environment in which techniques relating to managing and tracking transactions within a network as described herein may be implemented, according to at least one example.

FIG. 10 illustrates a network 1000 in accordance with at least one embodiment of the invention. The network 1000 includes the transaction management platform 902, the transformative integration engine 904, the sending systems 908, the receiving systems 910, the web application 926, and the interface 928 previously discussed. In this figure, however, details about the architecture of the transaction management platform 902 are illustrated in greater detail. The transaction management engine 906(B), the reconciliation engine 912, the notification engine 914, the anomaly detection engine 916, the health monitor engine 918, the interactive visualization engine 902, the transaction management storage 922, the data services engine 924, and any other engine, service, or module of the transaction management platform may be distributed between a data tier 1002, a service and business tier 1004, and a web tier 1006 of the transaction management platform 902. In some examples, more or fewer tiers are included as may be appropriate to implementing the message tracking techniques described herein. The data tier 1002 may include one or more computer systems configured to manage the data that is received, monitored, collected, and generated as part of implementing techniques related to message tracking. The data tier 1002 may therefore include a web server 1002(A), a data storage server 1002(B), and a file server 1002(C). The data tier 1002 may be configured to receive data in the form of messages from the sending systems 908 and the transformative integration engine 904. Within the data tier 1002, the unique message identifiers are generated and associated with the messages.

From the data tier 1002 data flows to the service and business tier 1004, and in some examples, to the receiving systems 910. The service and business tier 1004 includes one or more computer systems configured to provide services via the interface 928 and to manage other aspects of implementing techniques relating to message tracking as described herein. For example, within the service and business tier 1004 may reside the software and/or hardware configured to perform anomaly detection. As illustrated, the service and business tier 1004 may include a web server 1004(A), a data storage server 1004(B), and a generic server 1004(C). From the service and business tier 1004, the data, including indications (e.g., unique message identifiers), is provided to the web tier 1006. The web tier 1006 may include a web server 1006(A) and may be configured to provide access to at least a portion of the data generated within the transaction management platform. In particular, the web tier 1006 may be accessed via the web application 926.

Turning now to FIG. 11, in FIG. 11 is illustrated table 1100. The table 1100 may be configured to include a record for each message that is received by the transaction management platform 902. Thus, the table 1100 may include a plurality of rows and columns. The table 1100 includes a time created column 1104, a source application column 1106, a facility column 1108, a message type column 1110, a message control identification column 1112, and tracking columns 1114, and 1116. The data in the time created column 1104 indicates a time that each message was created. The data in the source application column 1106 indicates the application from which each message originated. The data in the facility column 1108 indicates a facility where each message was created. The data in the message type column 1110 indicates a message type of each message. The messages type may include any suitable message type used for transferring data. For example, the message types may be medical record, medical document, radiology orders, pharmacy orders, lab results, home medications, emergency room documents, observation results, patient problems, admissions/discharges, nursing documents, electronic medication, and any other suitable message type. The data in the message control identification column 1112 defines the source, purpose, destination, and certain syntax specifics like delimiters (separator characters) and character sets for each message. The data in the tracking columns 1114, 1116 are used to track the movements of the messages. For example, as each row corresponds to one message (or group of messages) that has been received and recorded by the transaction management platform 902, the entry (i.e., "Y") in the tracking column 1114 for a first row 1102 indicates that a first message was identified at the source node (e.g., "@Src"). Similarly, at the tracking column 1116 and the first row 1102 there is no entry. This may indicate that the first message has not made it to the node identified by "CL," which may be the next node after the source node. The column entries within the row 1102 may therefore correspond to the first message. Any or all of the column entries within the box 1102 may be found or added to the header of the first message. The table 1100 may include more columns than are illustrated. For example, for a message that is required to go through many different nodes to reach its destination there may be more tracking columns to account for the additional nodes.

The column entries in the source application column 1106, the facility column 1108, the message type column 1110, and the message control identification column 1112 may be concatenated together to create a unique message identifier for the first message. In some examples, other information is used to generate unique message identifiers. In some examples, the unique message identifier is generated and included in the table 1100, which is then saved. For example, for the first message (shown in the first row 1102), the unique message identifier may comprise the concatenation of the entries from the columns discussed above. The table 1100 may therefore include unique message identifiers for more than one message.

Figure 12:
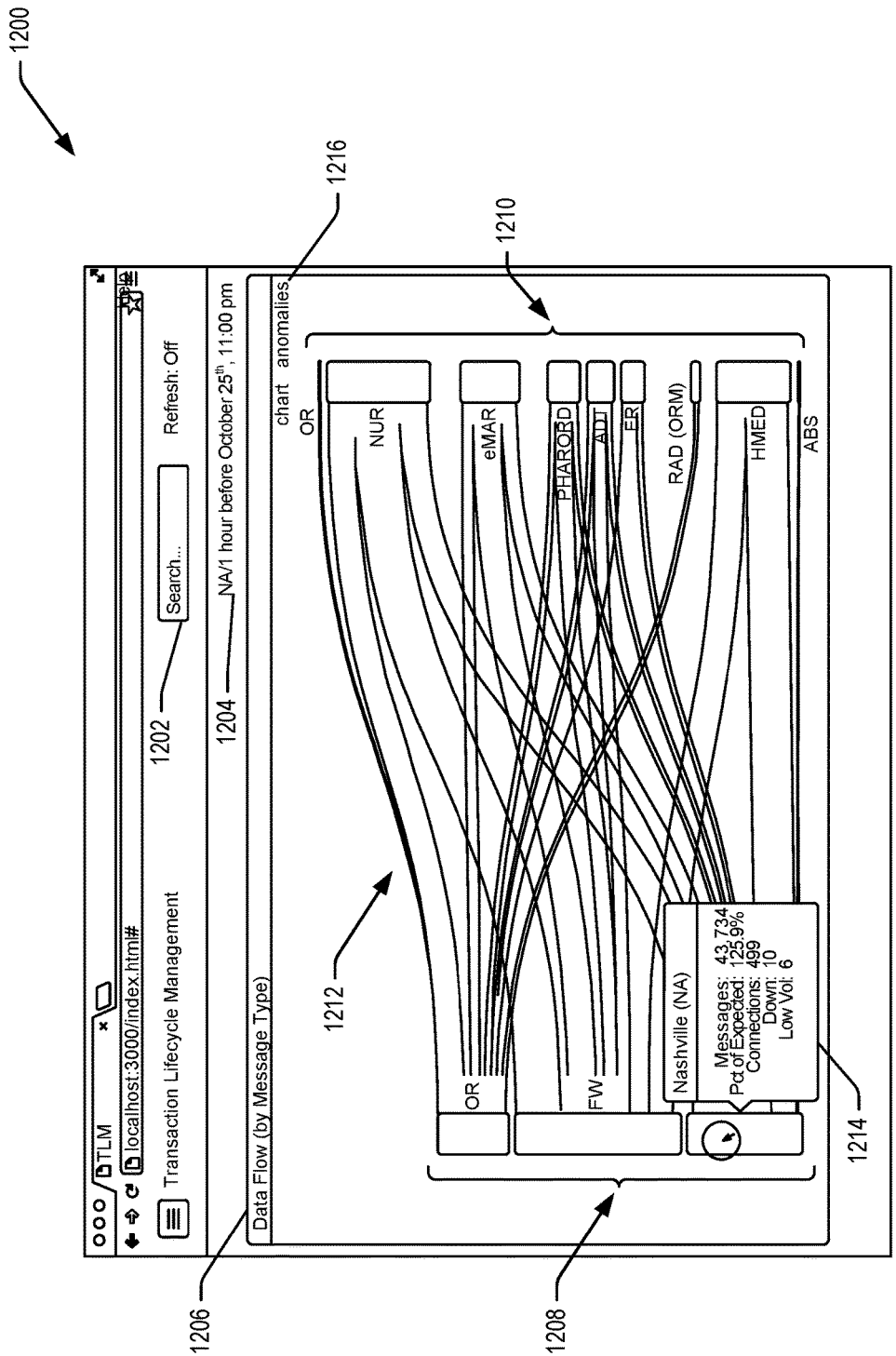
FIG. 12 is an example user interface illustrating techniques relating to managing and tracking transactions within a network as described herein, according to at least one example.

Turning next to FIG. 12, in FIG. 12 is illustrated a user interface 1200. FIGS. 11-19 illustrate other user interfaces in accordance with other embodiments. The user interface 1200 is an example of a user interface that may be used to view the message tracking information as described herein. For example, the interface 1200 may be accessible via a web application on a user device. The user interface 1200 includes suitable functionality to enable a user to interact with the message tracking information that will be provided on the user interface 1200. For example, the user interface 1200 includes a search bar 1202 and a time indicator 1204. The search bar 1202 enables a user to search for particular message types, nodes, messages, and the like. While the time indicator 1204 indicates a time period under consideration, which is related to what is presented on the user interface 1200. The time indicator 1204 also acts as a bread crumb indicator to indicate levels of granularity and the path that the user has taken within the user interface 1200. The user interface 1200 may also be user configurable. The user interface 1200 includes a graphical diagram 1206. The graphical diagram 1206 includes a graphical representation of nodes of and flow of messages within a network. The graphical diagram 1206 may be generated by the transaction management platform 902 in accordance with techniques described herein. Clicking on any of the nodes reveals a finer or coarser level of detail.

The graphical diagram 1206 includes regional nodes 1208 and message type nodes 1210. The individual regional nodes 1208 are connected to individual message type nodes 1210 via one or more chords 1212. The regional nodes 1208 are sized relative to each other and, in this example, depend on the relative volume of messages processed by each regional node, which may be a data center. For example, the regional node "FW" appears larger than the regional node "OR." This may be because the FW region sent, provided, or otherwise transferred more messages than in the OR region. Similarly, the message type nodes 1210 are sized relative to each other and, in this example, depend on the relative volume of messages for each message type. The chords 1212 are also sized relative to the number and type of messages for each region. For example, of all messages that originated the OR region, the largest number were "NUR" messages. Thus, the thickness of the chord between the OR data center and the NUR message type node is the thickest. As discussed herein, the number of the regional nodes 1208 and the number of the message type nodes 1210 is not fixed and may be adjusted depending on the underlying messages, filters, and other data organization measures.

The graphical diagram 1206 also includes popup 1214. The popup 1214 may be generated in response to a user selecting the "NA" regional node. The information provided in the popup 1214 may be helpful to the user to understand how messages are flowing in the data center represented by the NA regional node. The popup window 1214 illustrates the total volume of messages for NA ("43,734"), the percentage of expected messages ("125.9%"), the number of connections represented by this regional node ("499"), and other relevant information. In some examples, other information is presented. The information provided in the popup 1214 may be dynamically updated by the transaction management platform 902. Clicking on "anomalies" 1216 adjusts the graphical diagram 1206 to display a tabular view of message volume and other details about the messages represented in the graphical diagram 1206 prior to clicking the anomalies 1216.

Figure 13:
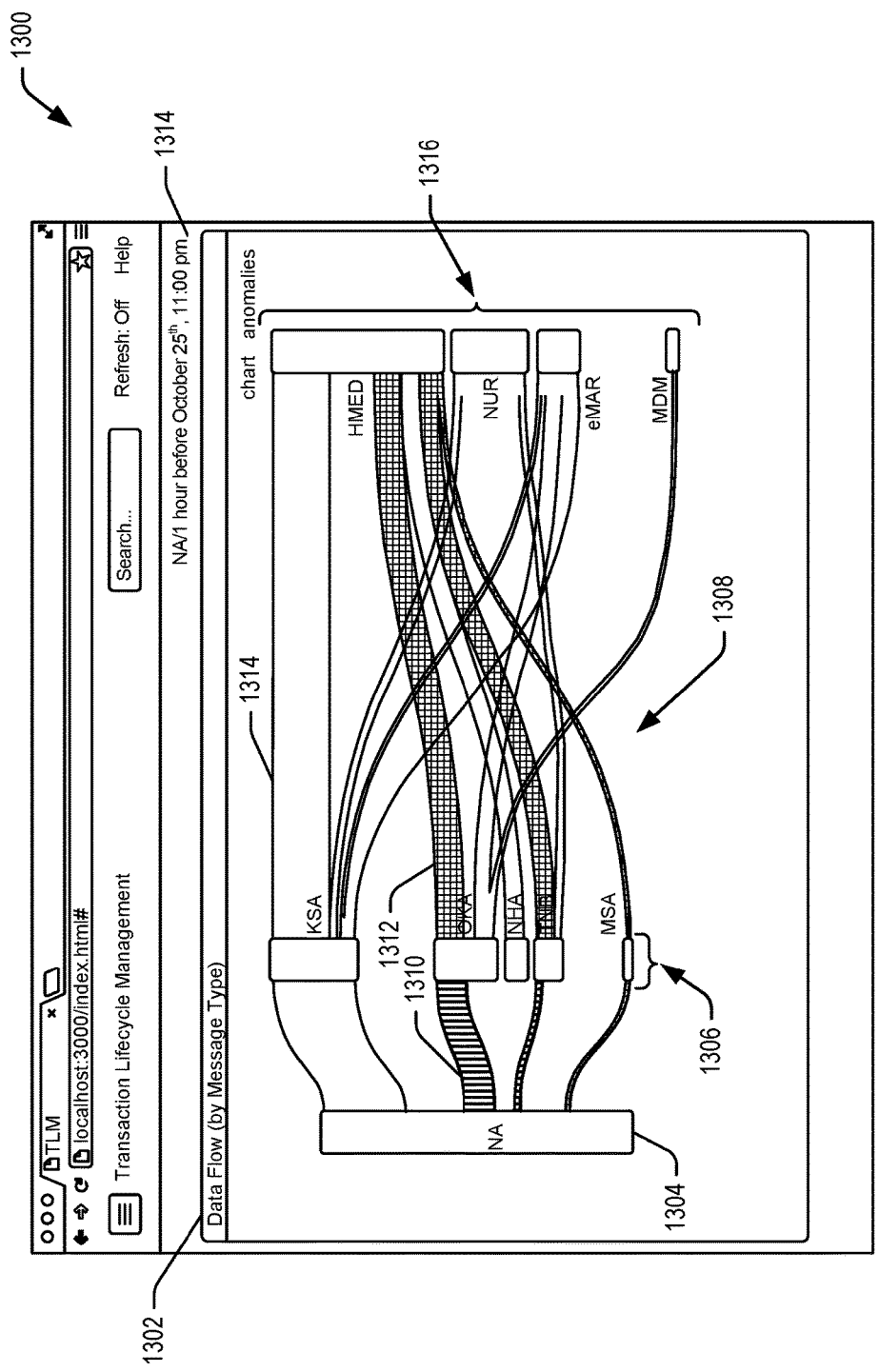
FIG. 13 is an example user interface illustrating techniques relating to managing and tracking transactions within a network as described herein, according to at least one example.

FIG. 13 illustrates a user interface 1300. The user interface 1300 is an example of the user interface 1200. The user interface 1300 includes a graphical diagram 1302. The graphical diagram 1302 is configured to display message data flow by message type. The graphical diagram 1302 includes a regional node 1304, facility nodes 1306, and message type nodes 1316 in a finer grain of detail than the graphical diagram 1202. This finer grain of detail is represented by the inclusion of the facility nodes 1306. The facility nodes 1306 may represent individual facilities within the region NA represented by the regional node 1304. Each facility represented by the facility nodes 1306 may include one or more devices accessing one or more applications which generate the messages represented in the graphical diagram 1302. In some examples, the techniques described herein may be used to display geographic views of message data flow. Such views may enable identification of problematic geographic areas. For example, were a data center that serves a geographic region, such a view would illustrate consequences (e.g., messages being backed up or held in caches, being negatively acknowledged, returned undeliverable, and other similar consequences).

The graphical diagram 1302 also includes chords 1308 connecting the regional node 1304, the facility nodes 1306, and the message types nodes 1316. In this example, the graphical diagram 1302 includes an anomaly detection overlay, indicated by the different chord fills. A large variety of overlays are available in order to tailor the display of the message tracking information on the graphical diagram 1302. Overlays or layers may be used to graphically highlight or emphasize certain elements of the message tracking information. For example, chord 1310 is illustrated as having a different fill than chords, 1312 and 1314. This may be because, based on the total volume of messages within the data center represented by regional node 1304, the messages flowing from the OKA facility are lower than expected. This may indicate an anomaly. Similarly for the chord 1312, the color or shading of the chord 1312 may indicate that the volume of message type HMED flowing out of the OKA facility is lower than expected, higher than expected, or falling within or without some other threshold. For example, a chord colored purple may indicate that the message volume is higher than expected for the time period under analysis (illustrated by time indicator 1318), a chord colored red may indicate that no messages were received, a chord colored yellow may indicate that the volume of messages is lower than expected, and a chord colored blue or no color may indicate that the volume of messages is within a range of what is expected. The range of expected volume may be determined by analyzing historical message flows and statistically analyzing the historical data flows to arrive at an expected data flow for region, facility, message type, or for other parameters.

Figure 14:
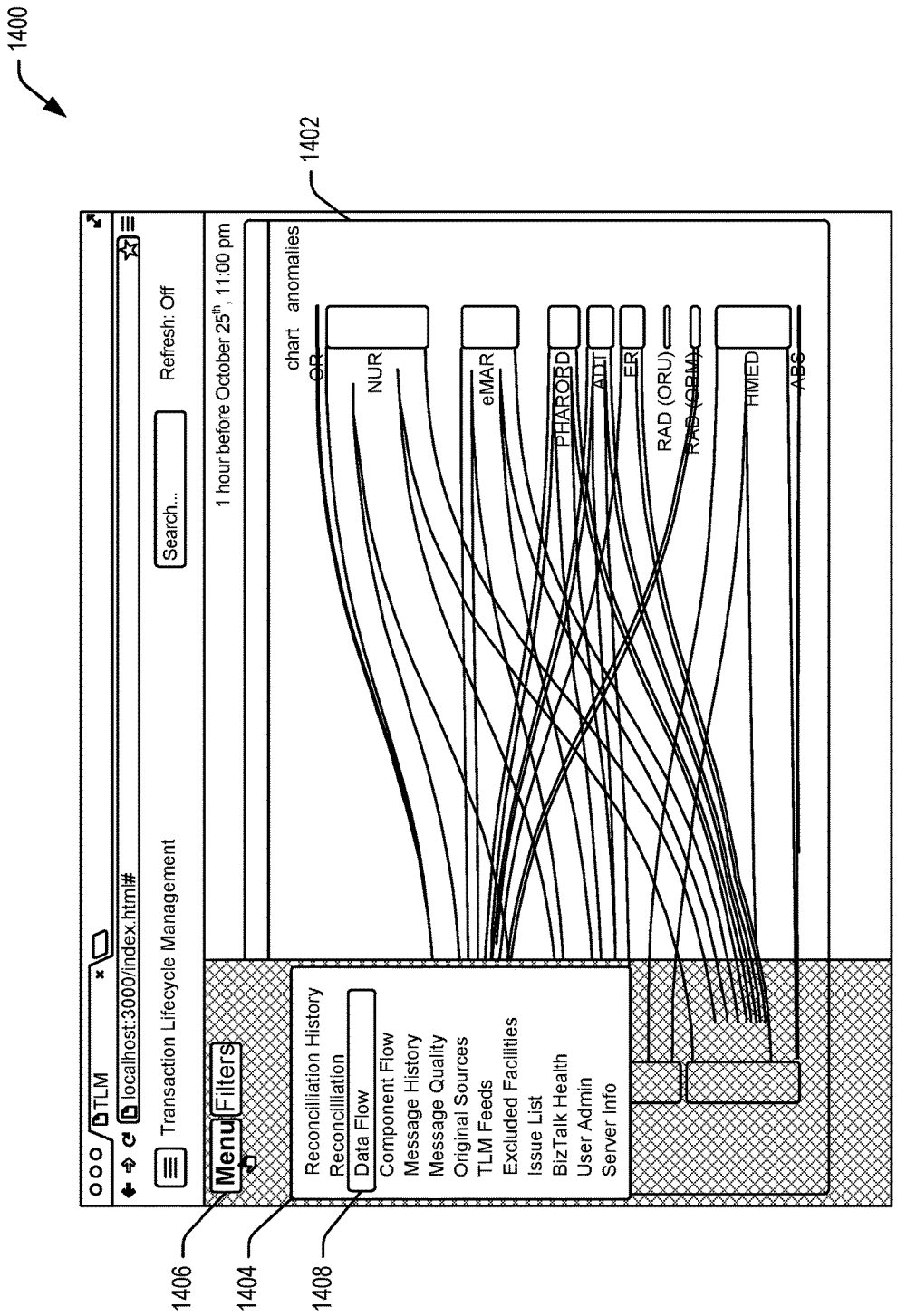
FIG. 14 is an example user interface illustrating techniques relating to managing and tracking transactions within a network as described herein, according to at least one example.

FIG. 14 illustrates a user interface 1400. The user interface 1400 is an example of the user interface 1200. The user interface 1400 includes a graphical diagram 1402. The graphical diagram 1402 is configured to display message data flow by message type. The graphical diagram 1402 particularly illustrates menu 1404. The menu 1404 is accessed by clicking menu button 1406. Accessing the menu 1404 enables a user to access many of the available layers, filters, overlays, and the like. These different options provide different methods of presenting message tracking information. For example, the menu 1404 includes items such as reconciliation history, reconciliation, data flow, component flow, message history, message quality original sources, TLM feeds, excluded facilities, issue list, BizTalk health, user admin, and server info. Clicking any one of the items will navigate to a different screen and/or organize the message tracking information differently. For example, box 1408 indicates that the current item selected is data flow. Thus, the graphical diagram 1402 presents message tracking information organized by the data flow item.

Figure 15:
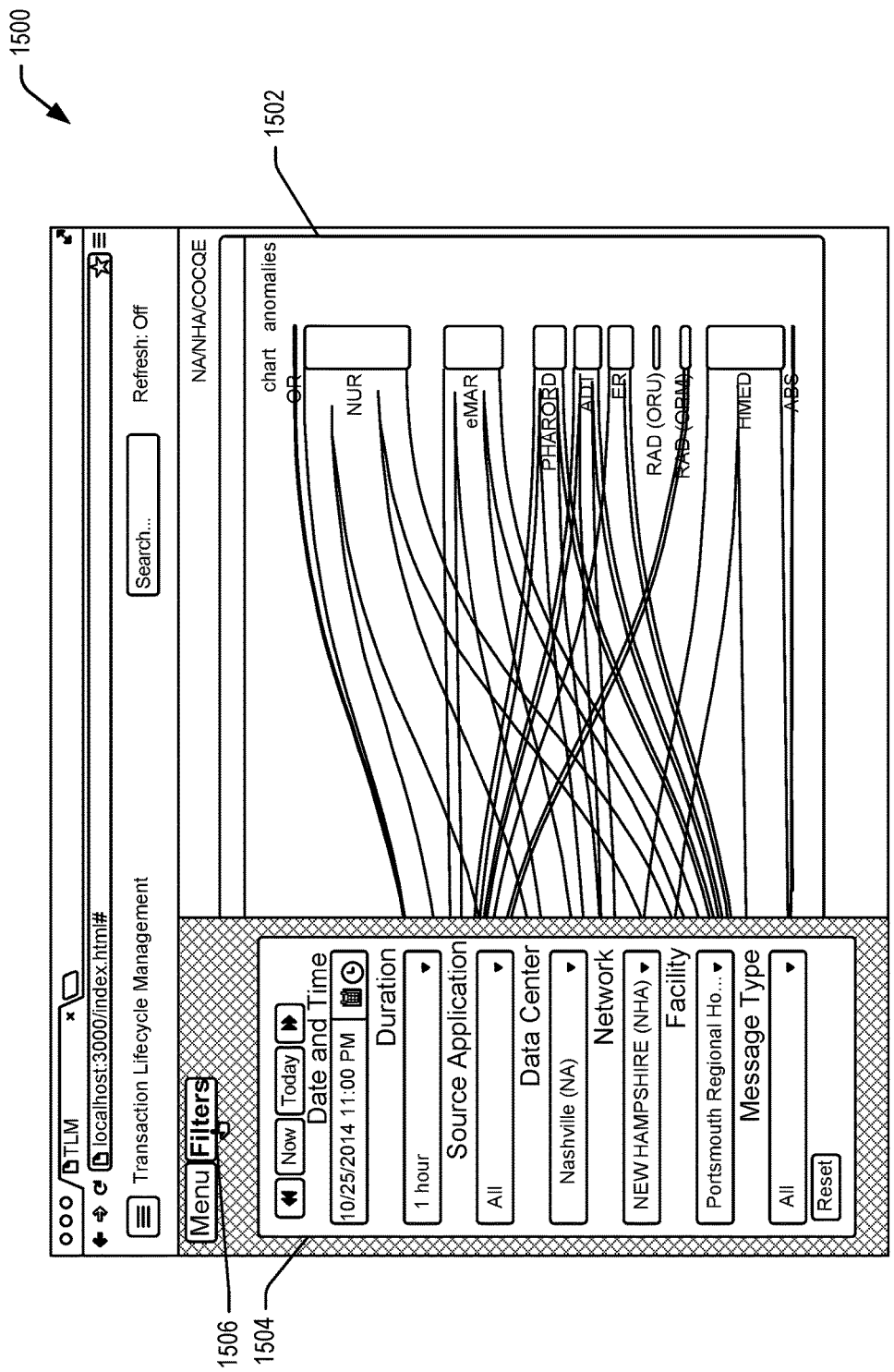
FIG. 15 is an example user interface illustrating techniques relating to managing and tracking transactions within a network as described herein, according to at least one example.

FIG. 15 illustrates a user interface 1500. The user interface 1500 is an example of the user interface 1200. The user interface 1500 includes a graphical diagram 1502. The graphical diagram 1502 is configured to display message data flow by message type. The graphical diagram 1502 particularly illustrates filter menu 1504. The filter menu 1504 is accessed by clicking filter button 1506. The filter button 1506 causes the filter menu 1504 to open. The filter menu 1504 includes a variety of filter options available for filtering the message tracking information. For example, the time period under consideration may be adjusted by adjusting the "date and time" filter option. Similarly, the "duration" option adjusts the amount of time corresponding to the time period. Other filter options in the filter menu 1504 include, for example, source and application option, data center option, network option, facility option, and message type option. The filters can be reset using the "reset" button.

Figure 16:
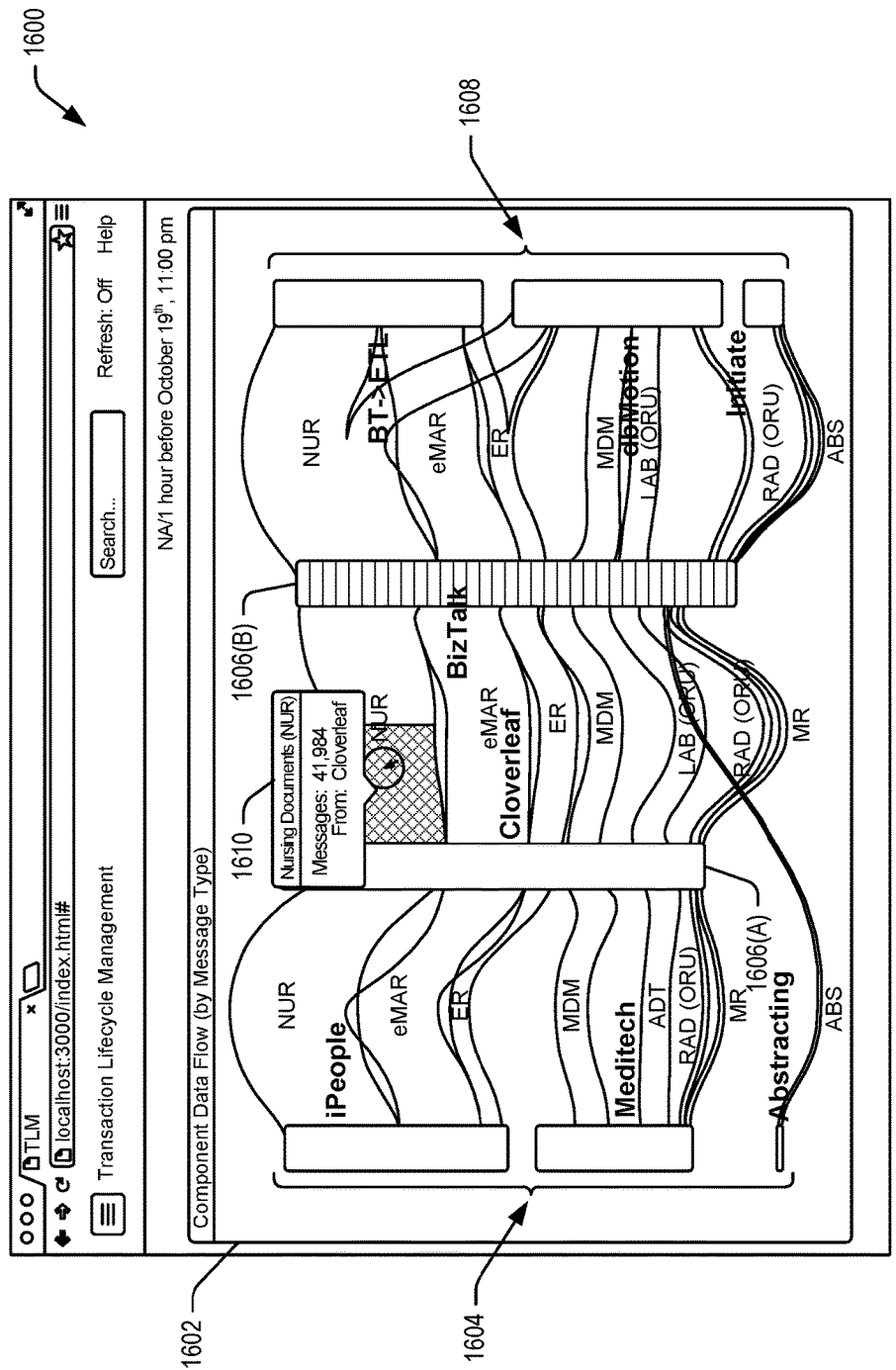
FIG. 16 is an example user interface illustrating techniques relating to managing and tracking transactions within a network as described herein, according to at least one example.

FIG. 16 illustrates a user interface 1600. The user interface 1600 is an example of the user interface 1200. The user interface 1600 includes a graphical diagram 1602. The graphical diagram 1602 is configured to display message component data flow by message type. Thus, in this example, a user has selected the "component flow" item from the menu 1404. The graphical diagram 1602 includes source nodes 1604, intermediate nodes 1606(A), 1606(B), and destination nodes 1608. Similarly as before, each of the source nodes 1604, the intermediate nodes 1606(A), 1606(B), and the destination nodes 1608 may be clicked to provide more or less granularity.

The intermediate node 1606(B) is illustrated differently than the other nodes. In some examples, this may indicate the health of the intermediate node 1606(B). In this example, the intermediate node 1606(B) is an integration engine, such as the transformative integration engine 102. Because the intermediate node 1606(B) is highlighted or formatted different than the other nodes, the health of the intermediate node 1606(B) may have fallen below some threshold, confidence level, some combination of a threshold and confidence level, or any other suitable method for determining when to illustrate a health concern. In some examples, the health of the intermediate node 1606(B) is determined by monitoring one or more operational characteristics corresponding to the component represented by the intermediate node 1606(B). Clicking on the intermediate node 1606(B) may load a different graphical diagram or table (e.g., a "health page") to present which operational characteristics have fallen below which thresholds. This information may be desirable for responding to health concerns relating to the component represented by the intermediate node 1606(B). Hovering over any of the chords causes a popup to appear, e.g., a popup 1610. The popup 1610 indicates the number of messages and where they most recently came from. In this example, the number of messages for the NUR message type between the intermediate node 1606(A) and the intermediate node 1606(B) is 41,984 and the most recent node is the intermediate node 1606(A), i.e., "Cloverleaf." In some examples, the health of the is updated in near real-time (e.g., every 5-10 minutes).

The source nodes 1604 are examples of sending systems discussed herein. In some examples, the source nodes 1604 are configured to manage certain aspects of clinical data. The destination nodes are examples of the receiving systems discussed herein. In some examples, the source nodes 1604 are configured to store messages transferred within the network. Using the techniques described herein, a user is enabled to view how the messages are moving from the source nodes 1604 to the destination nodes 1608.

Figure 17:
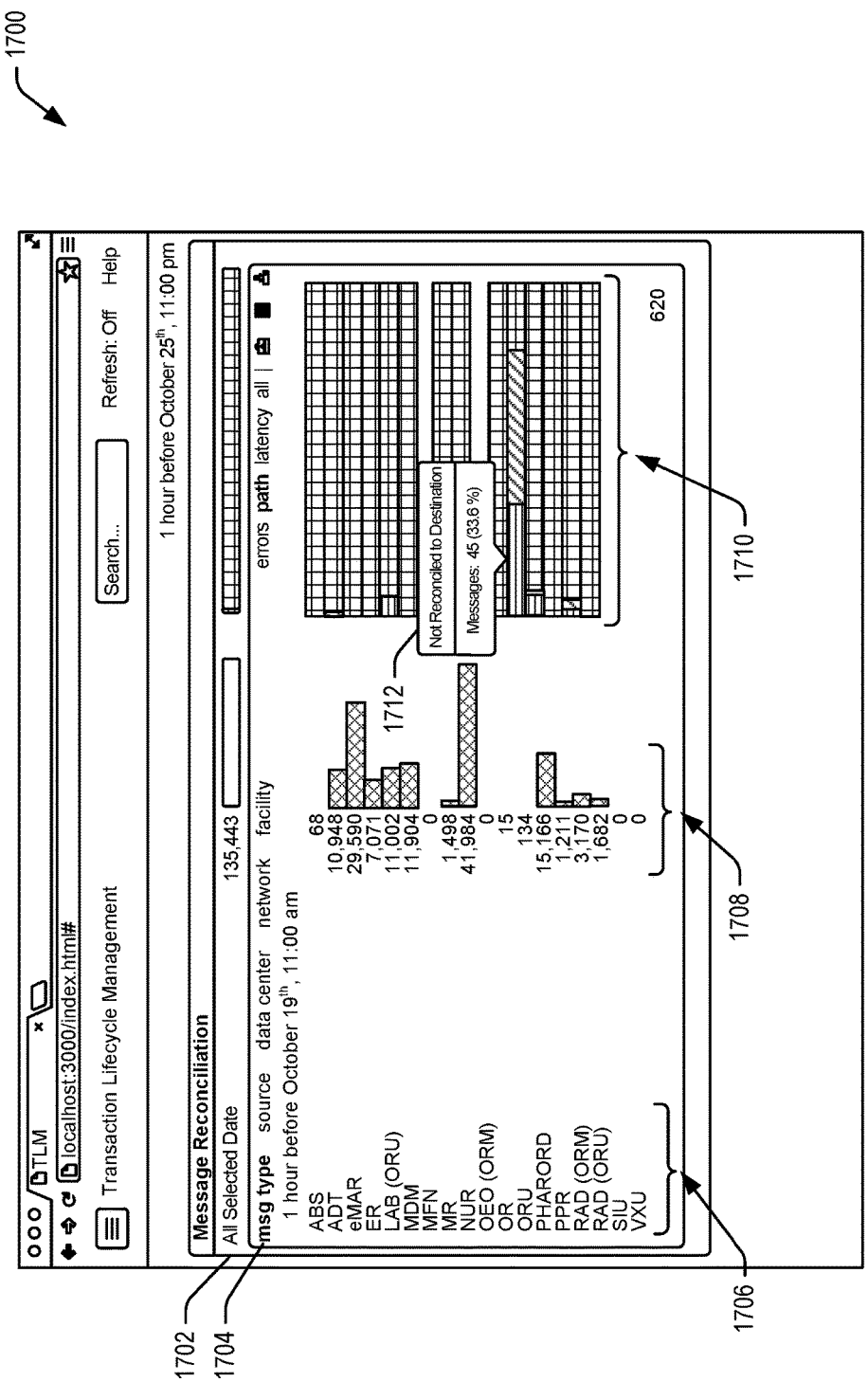
FIG. 17 is an example user interface illustrating techniques relating to managing and tracking transactions within a network as described herein, according to at least one example.

FIG. 17 illustrates a user interface 1700. The user interface 1700 is an example of the user interface 1200. The user interface 1700 includes a graphical diagram 1702. The graphical diagram 1702 is configured to display message data flow for reconciliation purposes. Use of the graphical diagram 1702 for message reconciliation enables a user to identify potential issues with message delivery. The graphical diagram 1702 can be organized by message type, source, data center, network, or facility. Similarly, the data can be presented based on errors, paths, latency, or all data. In this example, the graphical diagram 1702 is organized by message type because "msg type" option 1704 has been selected. The graphical diagram 1702 includes messages 1706 organized by message type. The graphical diagram 1702 also includes quantities of messages 1708 and status of messages area 1710. The status of messages area 1710 indicates, by way of adjusted formatting, the number of messages which reached their destinations, which were not reconciled, which were negatively acknowledged, and those for which reconciliation from the source is still unknown. Thus, in some examples, the graphical diagram 1702 illustrates different reconciliation statuses for messages in the network. In some examples, the bars in the message area 1710 are colored differently depending on the status of the messages. For example, green may indicate those messages that made it to their destination, yellow may indicate those messages for which there is no status, red may indicate those messages that were negatively acknowledged or unreconciled, and gray may indicate those messages that are ignored for one reason or another.

Hovering over the bars in the status of messages area 1710 reveals additional details about the messages represented by the bars. For example, a popup 1712 indicates details about certain messages that were not reconciled to their destination. The system may determine that a message is reconciled to a destination after the transaction management platform 902 receives an indication from the destination node that the message was received. In some examples, the graphical diagram 1702 may be altered by a user clicking on a button in a filter menu 1712. For example, the "path" filter is currently being applied, but selecting "errors," "latency," or "all" may bring up different message tracking data presented in a different manner. This different manner may include different formatting. In some examples, a user can click on any of the bars in the graphical diagram 1702 in order to see more details about the messages. For example, the user can click on the bar corresponding to the popup 1712 to see the actual 45 messages that are currently unreconciled. From this location, the user can also generate a case for resolving the problem, download the messages, adjust the statuses, and replay the messages to see where the problem may be located.

Figure 18:
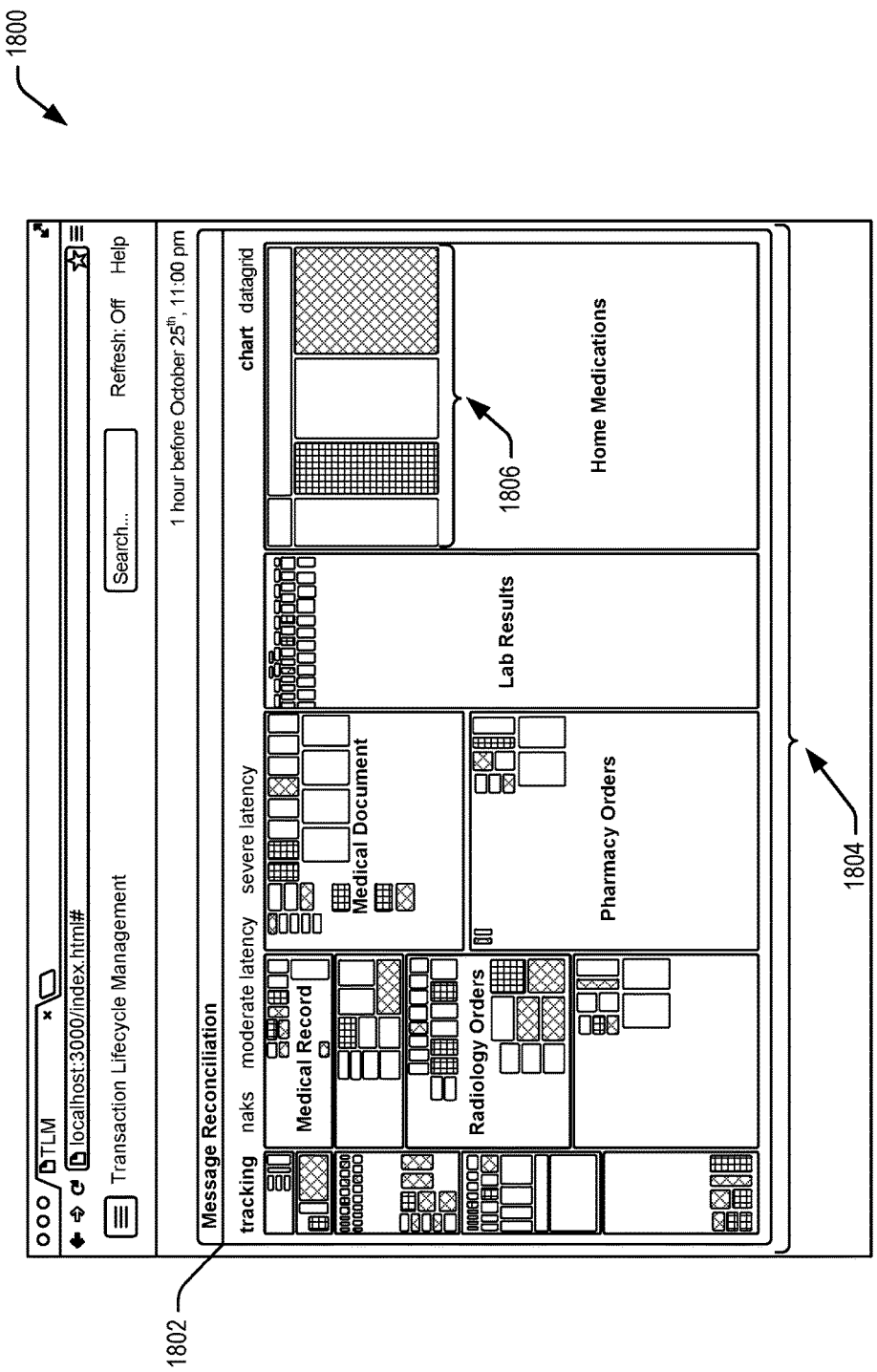
FIG. 18 is an example user interface illustrating techniques relating to managing and tracking transactions within a network as described herein, according to at least one example.

FIG. 18 illustrates a user interface 1800. The user interface 1800 is an example of the user interface 1200. The user interface 1800 includes a graphical diagram 1802. The graphical diagram 1802 is configured to display message data flow quality by facility. In particular, the graphical diagram 1802 depicts a graphical representation of the quantity of messages and the status of messages compared to quantities and statuses of other messages. Thus, the graphical diagram 1802 includes one or more major shapes 1804. In this example, the one or more major shapes 1804 are the larger rectangles in the graphical diagram 1802, which include smaller rectangles (e.g., minor shapes) within. For example, the rectangle with the term "Home Medications" is a major shape, while located within this major shape is located one or more minor shapes 1806. The other major shapes 1804 also include other minor shapes. In this example, each of the major shapes 1804 corresponds to a type of message. The size of the minor shapes 1806 is proportional to the gross number of errors corresponding to the messages of the particular type. The formatting (e.g., color, shading, fill, etc.) of each of the minor shapes (e.g., the minor shapes 1806 and others in the major shapes 1804) represents the percentage of errors compared to the total number of messages. In this example, the minor shapes 1806 and the others in the major shapes 1804 correspond to facilities within the network. A user can click on any one of the major shapes 1804 and will be navigated to a zoomed-in view of the major shape, as illustrated in FIG. 19.

In some examples, the message tracking information may be presented differently in the graphical diagram 1802 by selecting "naks," "moderate latency," or "severe latency." Each of these selections may act as a filter to adjust the data that is presented. For example, selecting one of the "latency" selections may adjust the graphical diagram 1802 to display the data based on latency. In some examples, the formatting in the latency selection may correspond to one of the following: for messages that took less than 3 minutes, a first color, shade, or fill may be used; for messages that took greater than three minutes, but less than four hours, a second color, shade, or fill may be used; for messages that took greater than four hours, a third color, shade, or fill may be used; and for all other messages, a fourth color, shade, or fill may be used. In this manner, the graphical diagram 1802 may be organized according to latency and present data in a prioritized fashion. The data is prioritized because the user can immediately see not only the gross number of messages (represented by size of the shapes), but also the intensity of the problem (i.e., the percentage of the whole) represented by the formatting of the shapes. In some examples, the minor shapes 1806 (and other minor shapes) may fill the entirety of the major shapes 1804. In some examples, the minor shapes 1806 and/or the major shapes 1804 are rectangles, squares, polygons, circles, and any other suitable shape.

Figure 19:
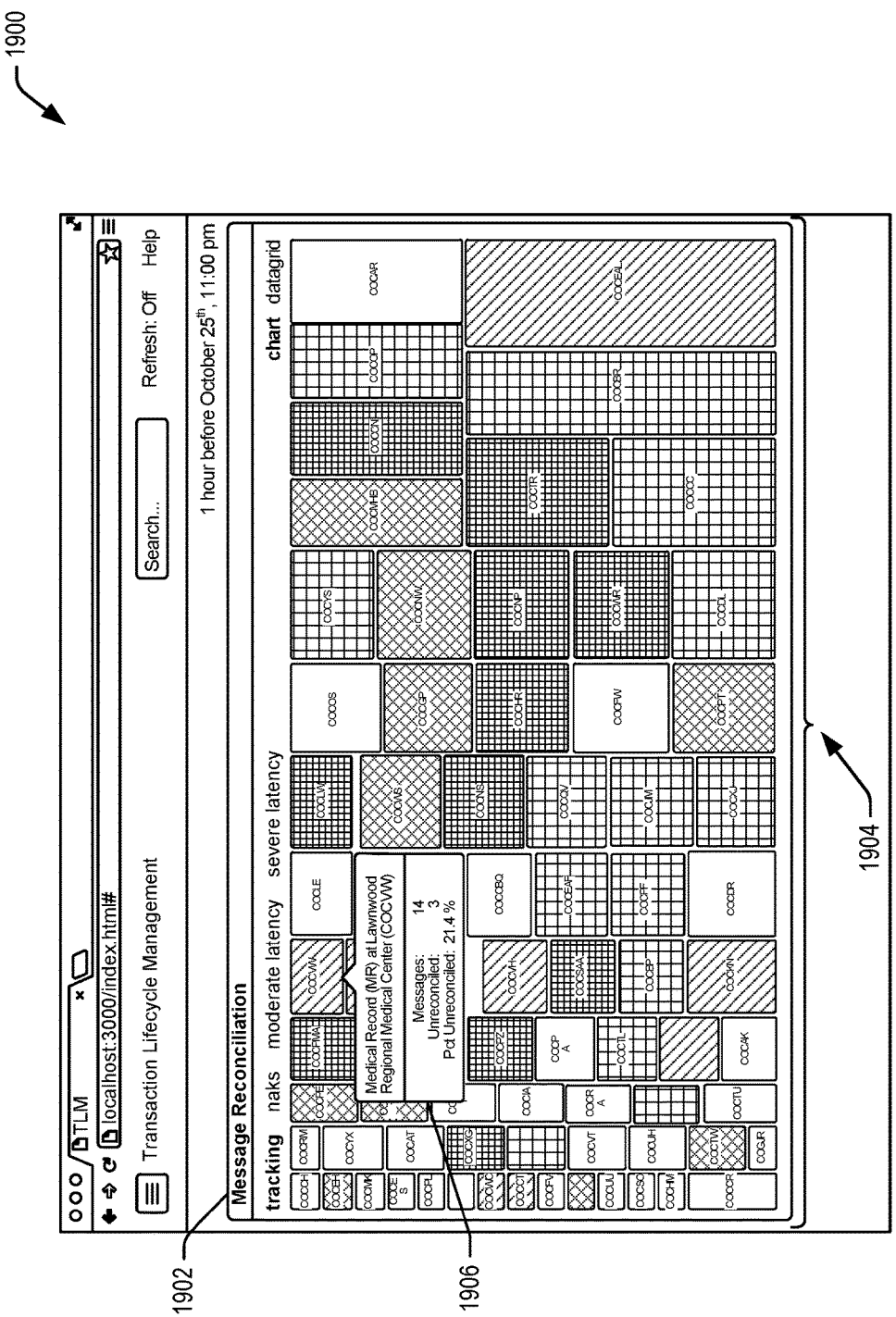
FIG. 19 is an example user interface illustrating techniques relating to managing and tracking transactions within a network as described herein, according to at least one example.

FIG. 19 illustrates a user interface 1900. The user interface 1900 is an example of the user interface 1200. The user interface 1900 includes a graphical diagram 1902. The graphical diagram 1902 is configured to display message data flow quality by facility. In particular, the graphical diagram 1902 depicts a graphical representation of the quantity of messages of a single type and the status of those messages for multiple facilities. In some examples, the graphical diagram 1902 is generated as a result of a user clicking on the major shape entitled "Medical Record" shown in FIG. 18. Thus, the graphical diagram 1902 includes one or more minor shapes 1904 arranged in a chart format. The size of the minor shapes 1904 is proportional to the gross number of errors for the medical record type of message which correspond to each of the different facilities (e.g., COCVW, COCLE, etc.) in the network. The formatting (e.g., color, shading, fill, etc.) of each of the minor shapes 1904 represents the percentage of errors compared to the total number of messages for the particular minor shape. In this manner, both the number of messages and the intensity of the problem are highlighted. Thus, a popup 1906 illustrates that for the medical facility named "Medical Record (MR) at Lawnwood Regional Medical Center (COCVW)," 14 messages have been received, 3 are unreconciled, which constitutes 21.4% of the total messages of the message type medical record for this facility. Similar to the graphical diagram 1802, the graphical diagram 1902 can be adjusted to display message tracking information based on negatively acknowledged messages (i.e., "naks"), "moderate latency," or "severe latency." In some examples, the diagram 1902 may be adjusted to display similar data in a data grid format.

Figure 20:
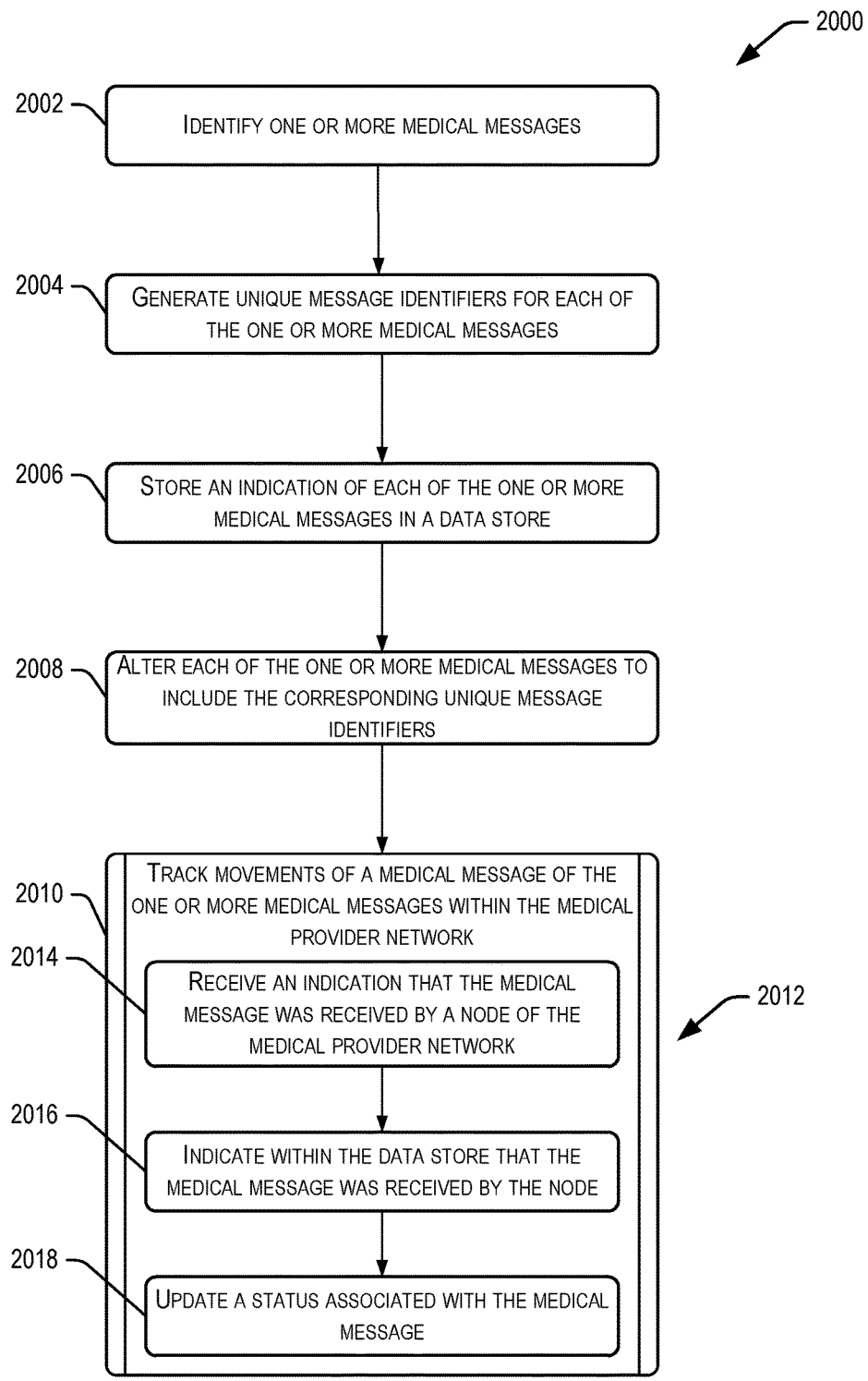
FIG. 20 is a flow diagram depicting example acts for implementing techniques relating to managing and tracking transactions within a network as described herein, according to at least one example.

FIG. 20 illustrates a flowchart of a process 2000 for tracking movement of messages within a network according to an embodiment of the invention. Some or all of the process 2000 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The process 2000 begins at block 2002 by identifying one or more messages. In some examples, each of the messages is representative of a single transaction within the network. Each of the messages may originate from a respective source node of the network.

At 2004, the process 2000 generates unique message identifiers for each of the one or more messages. In some examples, each unique message identifier may be generated based at least in part on at least one of a source application identifier, a source facility identifier, a message type identifier, or a message control identifier. In some examples, the unique message identifier is a concatenation of the source application identifier, the source facility identifier, the message type identifier, and the message control identifier. In some examples, the unique message identifier represents an underlying message and is used to track the movement of the message as it moves throughout the network. In some examples, the unique message identifier represents a pointer that points to the message and enables selection and access of the message wherever it may be stored.

At 2006, the process 2000 stores an indication of each of the one or more messages in a data store. In some examples, the indication of each of the one or more messages is associated with the corresponding unique message identifiers. Thus, in some examples, the unique message identifier is stored in a data store in a tabular format. For example, the table may include a source application identifier, a source facility identifier, a message type identifier, a message control identifier, and any other suitable entry for tracking the movement of the message. In some examples, once a message is received by a node of the network, the table is updated to indicate as such. In this manner, the movement of the message is tracked throughout the network.

At 2008, the process 2000 alters each of the one or more messages to include the corresponding unique message identifiers. In some examples, altering the messages may include adding the unique message identifier to the headers of the messages. In some examples, the messages are in the HL7 format or any other suitable format.

At 2010, the process 2000 tracks movements of a message of the one or more messages within the network. In some examples, the block 2010 is performed by sub-process 2012. Thus, at 2014, the sub-process 2012 receives an indication that the message was received by a node of the network. In some examples, the indication is received by the transaction management platform. At 2016, the sub-process 2012 indicates, within the data store and based at least in part on a unique message identifier corresponding to the message, that the message was received by the node of the network. At 2018, the sub-process 2012 updates a status associated with the message based at least in part on the indication. In some examples, the status may indicate that the message was received, negatively acknowledged, not received, or unknown.

Figure 21:
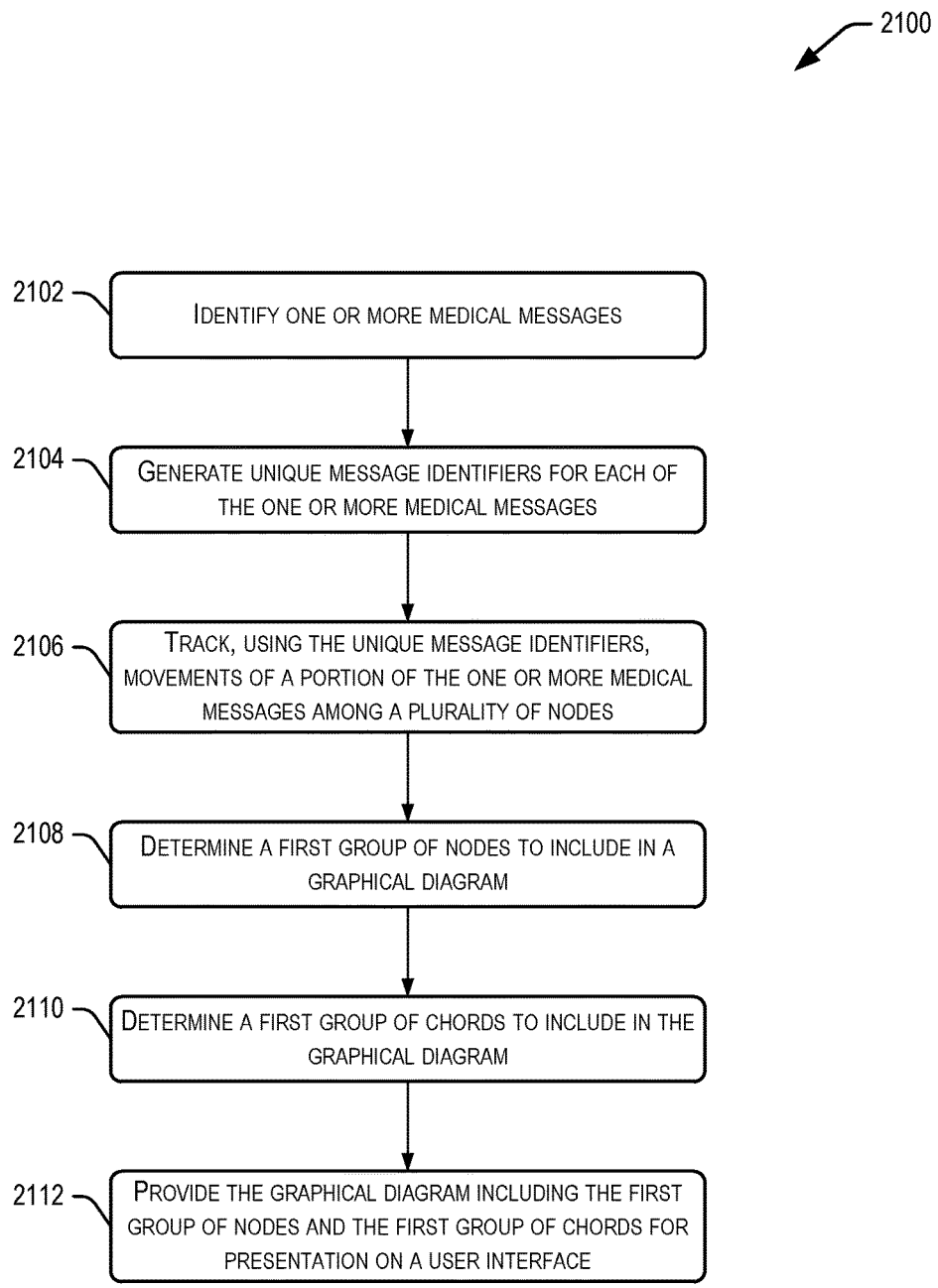
FIG. 21 is a flow diagram depicting example acts for implementing techniques relating to managing and tracking transactions within a network as described herein, according to at least one example.

FIG. 21 illustrates a flowchart of a process 2100 for providing interactive visualization of message tracking information according to an embodiment of the invention. The process 2100 begins at block 2102 by identifying one or more messages. In some examples, each of the messages is representative of a single transaction within the network. Each of the messages may originate from a respective source node of the network.

At 2104, the process 2100 generates unique message identifiers for each of the one or more messages. In some examples, each unique message identifier may be generated based at least in part on at least one of a source application identifier, a source facility identifier, a message type identifier, or a message control identifier. In some examples, the unique message identifier is a concatenation of the source application identifier, the source facility identifier, the message type identifier, and the message control identifier. In some examples, the unique message identifier represents an underlying message and is used to track the movement of the message as it moves throughout the network. In some examples, the unique message identifier represents a pointer that points to the message and enables selection and access of the message wherever it may be stored.

At 2106, the process 2100 tracks, using the unique message identifiers, movements of a portion of the one or more messages among the plurality of nodes of the network. In some examples, tracking the movements of the portion of the one or more messages includes receiving updates from nodes that receive the messages. In some examples, the nodes of the network include computer systems, components, devices, geographic regions, message types, facilities, applications, and any other suitable representation of data flow that can be tracked.

At 2108, the process 2100 determines a first group of nodes to include in a graphical diagram, the first group of nodes selected from the plurality of nodes of the network. In some examples, the first group of nodes may include geographic nodes of the network and message type nodes. Thus, in some examples, the first group of nodes includes nodes that represent different aspects of the network. Any suitable combination of nodes, representing varying aspects of the network, may be included in the first group of nodes.

At 2110, the process 2100 determines a first group of chords to include in the graphical diagram, the first group of chords providing graphical depictions of message flow between at least a portion of the first group of nodes. In some examples, the width of the chords correspond to the number of messages associated with the two nodes. For example, the width may represent the number of messages flowing between the two nodes. Additionally, in some examples, the width may represent the number of messages of a particular message type that have been processed by one of the nodes. In this manner, the chords may represent different aspects of data flow.

At 2112, the process 2100 provides the graphical diagram including the first group of nodes and the first group of chords for presentation on a user interface. In some examples, the graphical diagram is configurable to depict movements of the portion of the one or more messages among the first group of nodes.

Figure 22:
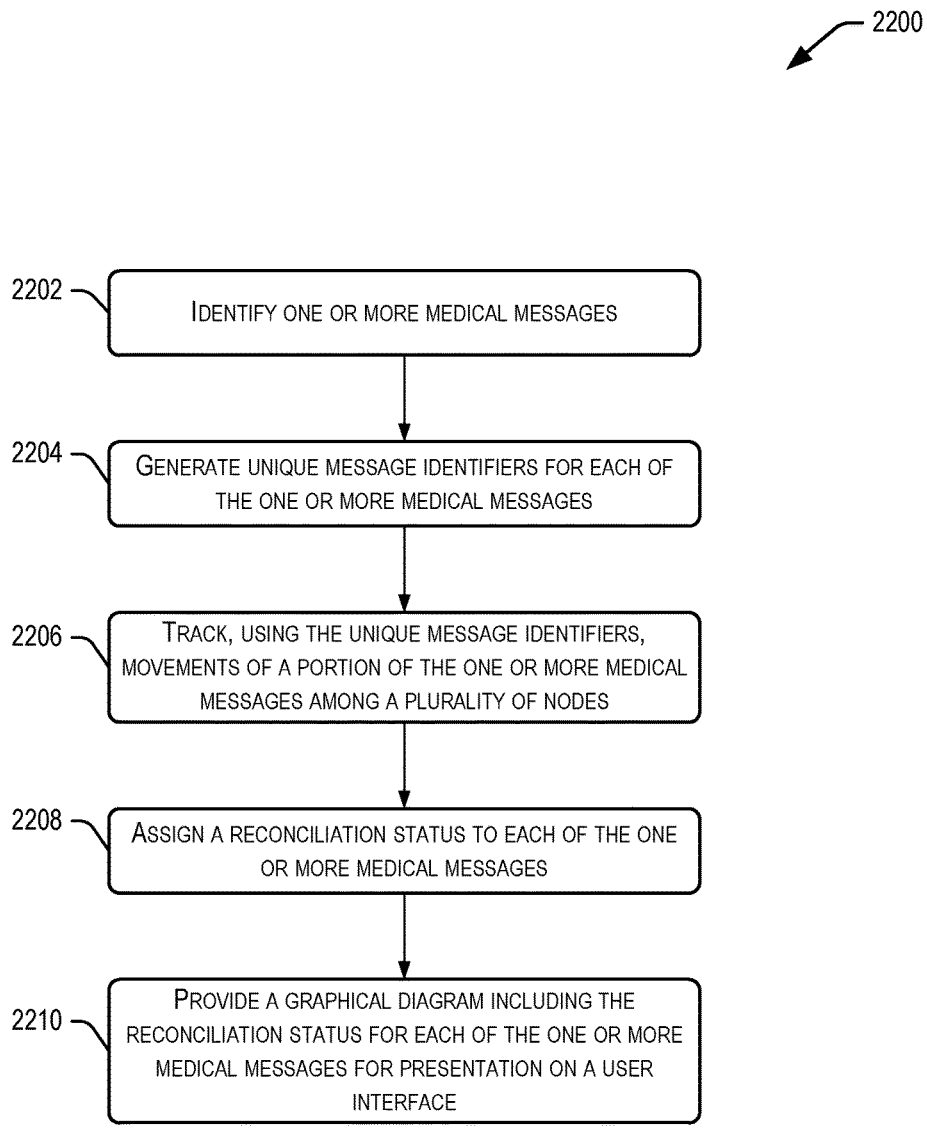
FIG. 22 is a flow diagram depicting example acts for implementing techniques relating to managing and tracking transactions within a network as described herein, according to at least one example.

FIG. 22 illustrates a flowchart of a process 2200 for providing interactive visualization of message tracking information according to an embodiment of the invention. The process 2200 begins at block 2202 by identifying one or more messages. In some examples, each of the messages is representative of a single transaction within the network. Each of the messages may originate from a respective source node of the network.

At 2204, the process 2200 generates unique message identifiers for each of the one or more messages. In some examples, each unique message identifier may be generated based at least in part on at least one of a source application identifier, a source facility identifier, a message type identifier, or a message control identifier. In some examples, the unique message identifier is a concatenation of the source application identifier, the source facility identifier, the message type identifier, and the message control identifier. In some examples, the unique message identifier represents an underlying message and is used to track the movement of the message as it moves throughout the network. In some examples, the unique message identifier represents a pointer that points to the message and enables selection and access of the message wherever it may be stored.

At 2206, the process 2200 tracks, using the unique message identifiers, movements of a portion of the one or more messages among the plurality of nodes of the network. In some examples, tracking the movements of the portion of the one or more messages includes receiving updates from nodes that receive the messages. In some examples, the nodes of the network include computer systems, components, devices, geographic regions, message types, facilities, applications, and any other suitable representation of data flow that can be tracked.

At 2208, the process 2200 assigns a reconciliation status to each of the one or more messages assigning a reconciliation status to each of the one or more messages. In some examples, the reconciliation status corresponds to whether each of the one or more messages were received by respective destination nodes. In some examples, the reconciliation status may include whether a message was successfully received, negatively acknowledged, not received, or unknown. In some examples, the reconciliation status may be generated dynamically in response to user input.

At 2210, the process 2200 provides a graphical diagram including the reconciliation status for each of the one or more messages for presentation on a user interface. In some examples, the graphical diagram includes a graph indicating the statuses for groups of messages organized by message type, facility, or otherwise.

Figure 23:
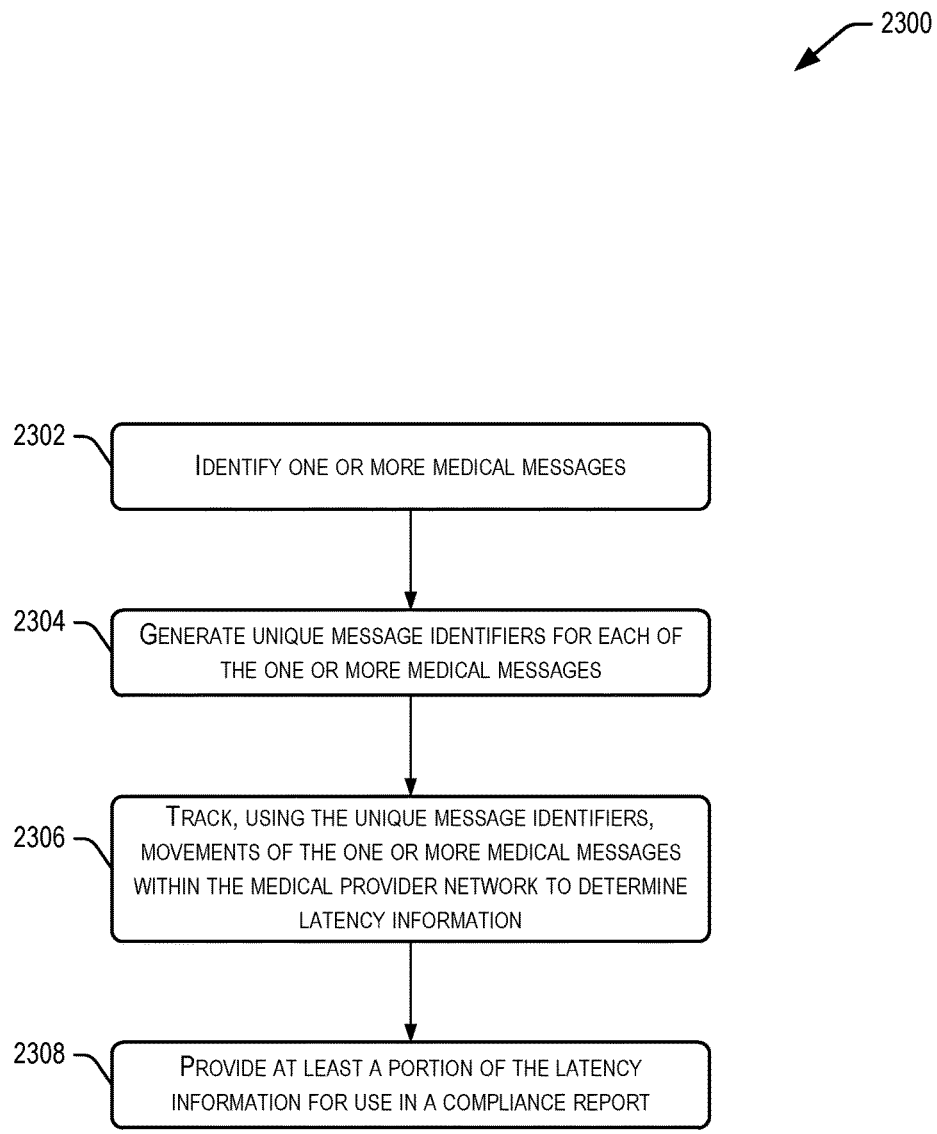
FIG. 23 is a flow diagram depicting example acts for implementing techniques relating to managing and tracking transactions within a network as described herein, according to at least one example.

FIG. 23 illustrates a flowchart of a process 2300 for providing interactive visualization of message tracking information according to an embodiment of the invention. The process 2300 begins at block 2302 by identifying one or more messages. In some examples, each of the messages is representative of a single transaction within the network. Each of the messages may originate from a respective source node of the network.

At 2304, the process 2300 generates unique message identifiers for each of the one or more messages. In some examples, each unique message identifier may be generated based at least in part on at least one of a source application identifier, a source facility identifier, a message type identifier, or a message control identifier. In some examples, the unique message identifier is a concatenation of the source application identifier, the source facility identifier, the message type identifier, and the message control identifier. In some examples, the unique message identifier represents an underlying message and is used to track the movement of the message as it moves throughout the network. In some examples, the unique message identifier represents a pointer that points to the message and enables selection and access of the message wherever it may be stored.

At 2306, the process 2300 tracks, using the unique message identifiers, movements of a portion of the one or more messages among the plurality of nodes of the network. In some examples, tracking the movements of the portion of the one or more messages includes receiving updates from nodes that receive the messages. In some examples, the nodes of the network include computer systems, components, devices, geographic regions, message types, facilities, applications, and any other suitable representation of data flow that can be tracked.

At 2308, the process 2300 provides providing at least a portion of the latency information for use in a compliance report. In some examples, the compliance report in provided to a reporting agency, stakeholders, operators, or other entities and/or individuals. Preparation of the compliance report may include the collection of statistics relating to the care and service offered at a medical facility. For example, the compliance report may indicate the timeliness of discharges of patients. By analyzing the movement of messages within the network, the timeliness of patient discharge may be determined. In some examples, this may include comparing a time of a first message indicating an action prior to discharge with a time of a second message indicating an action after and/or at discharge. In some examples, the compliance report may be at least partially auto-generated using the techniques described herein. In some examples, the compliance report may be required by a service level agreement.

Figure 24:
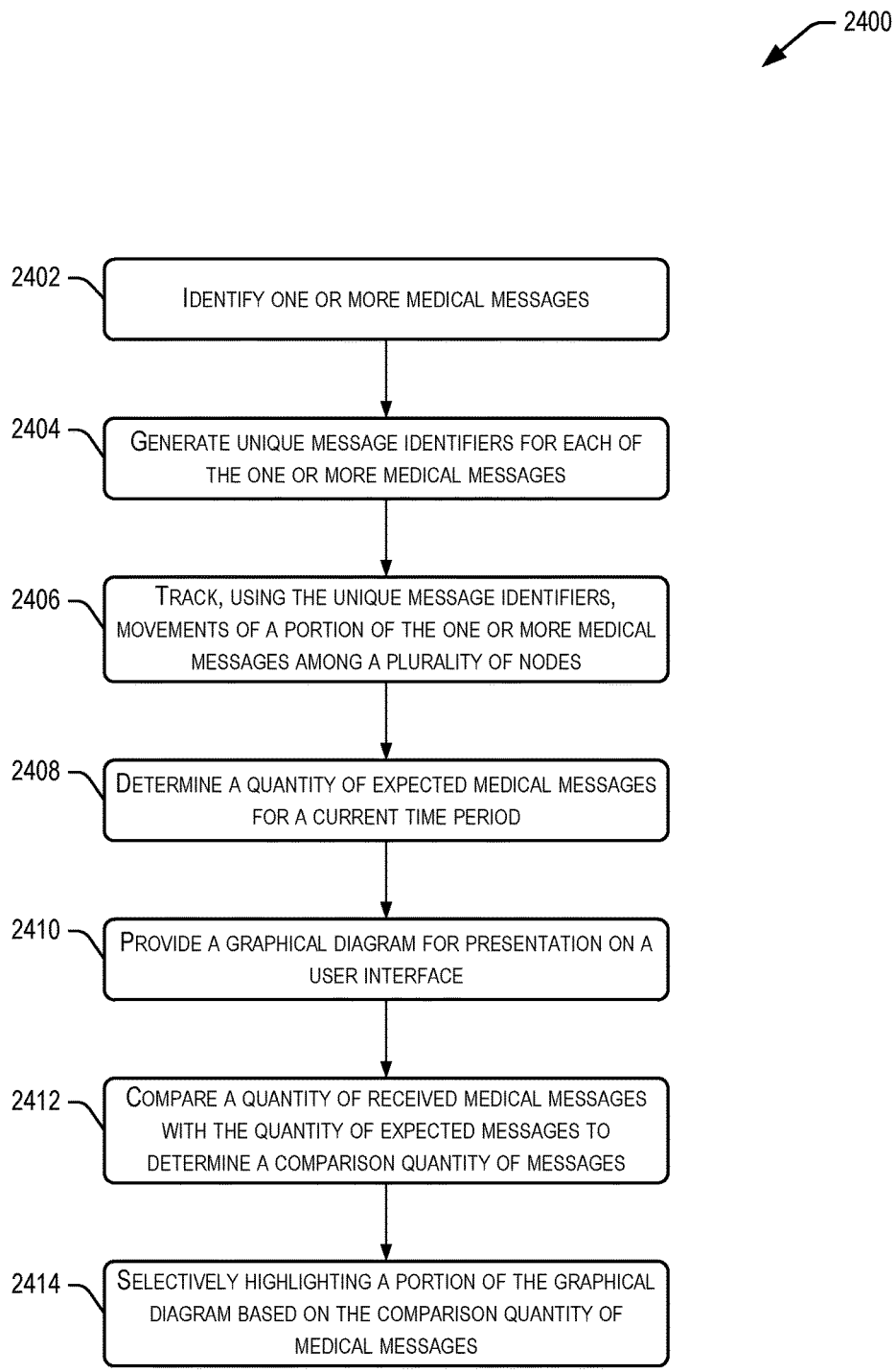
FIG. 24 is a flow diagram depicting example acts for implementing techniques relating to managing and tracking transactions within a network as described herein, according to at least one example.

FIG. 24 illustrates a flowchart of a process 2400 for providing interactive visualization of message tracking information according to an embodiment of the invention. The process 2400 begins at block 2402 by identifying one or more messages. In some examples, each of the messages is representative of a single transaction within the network. Each of the messages may originate from a respective source node of the network.

At 2404, the process 2400 generates unique message identifiers for each of the one or more messages. In some examples, each unique message identifier may be generated based at least in part on at least one of a source application identifier, a source facility identifier, a message type identifier, or a message control identifier. In some examples, the unique message identifier is a concatenation of the source application identifier, the source facility identifier, the message type identifier, and the message control identifier. In some examples, the unique message identifier represents an underlying message and is used to track the movement of the message as it moves throughout the network. In some examples, the unique message identifier represents a pointer that points to the message and enables selection and access of the message wherever it may be stored.

At 2406, the process 2400 tracks, using the unique message identifiers, movements of a portion of the one or more messages among the plurality of nodes of the network. In some examples, tracking the movements of the portion of the one or more messages includes receiving updates from nodes that receive the messages. In some examples, the nodes of the network include computer systems, components, devices, geographic regions, message types, facilities, applications, and any other suitable representation of data flow that can be tracked.

At 2408, the process 2400 determines a quantity of expected messages for a current time period. In some examples, the determination is based at least in part on historical message data for a time period. In some examples, the time period corresponds to the current time period. In some examples, the time period is a period of time in the past which can be used as a baseline for comparing with the current time period. For example, for the time period the historical message data may indicate that a certain number of messages were received (e.g., 5,000). In some examples, the historical message data indicates, for each node of the network, the number of messages, the message types, the problems associated with the network at that time, the source application types, and any other suitable type of information that is tracked by the transaction management platform. In some examples, the expected messages are the same quantity of messages received in the time period. Thus, if the expected messages, in this example, may be 5,000.

At 2410, the process 2400 provides a graphical diagram for presentation on a user interface. In some examples, the graphical diagram includes a representation of movement of at least a portion of the one or more messages within the network for the current time period. In some examples, the portion of the one or more messages is presented in a manner including nodes and chords as described herein. In some examples, the portion of the one or more messages is presented in a manner including sliding bar graphs.

At 2412, the process 2400 compares a quantity of received messages with the quantity of expected messages to determine a comparison quantity of messages. In some examples, the comparison quantity of messages is determined by subtracting the received messages from the expected messages. In some examples, the comparison quantity of messages is used to determine whether the quantity of received messages exceeds, goes below, or equals the quantity of expected messages.

At 2414, the process 2400 selectively highlights a portion of the graphical diagram based at least in part on the comparison quantity of messages. In some examples, if the comparison quantity of messages or the quantity of received messages exceeds a threshold corresponding to the expected messages, nodes of the graphical diagram may be highlighted a first color. In some examples, if the comparison quantity of messages or the quantity of received messages greatly exceeds a threshold corresponding to the expected messages, nodes of the graphical diagram may be highlighted a second color. In some examples, if the comparison quantity of messages or the quantity of received messages falls below a threshold corresponding to the expected messages, nodes of the graphical diagram may be highlighted a third color. In some examples, if the comparison quantity of messages or the quantity of received messages falls very below a threshold corresponding to the expected messages, nodes of the graphical diagram may be highlighted a fourth color. In some examples, if the comparison quantity of messages or the quantity of received messages is undeterminable, nodes of the graphical diagram may be highlighted a fifth color. In some examples, chords of the graphical diagram are also selectively highlighted. In some examples, the highlighting of the portion of the graphical diagram includes changing the color, shading, fill, or other formatting of nodes, chords, graphs, text, and the like in the graphical diagram.

Figure 25:
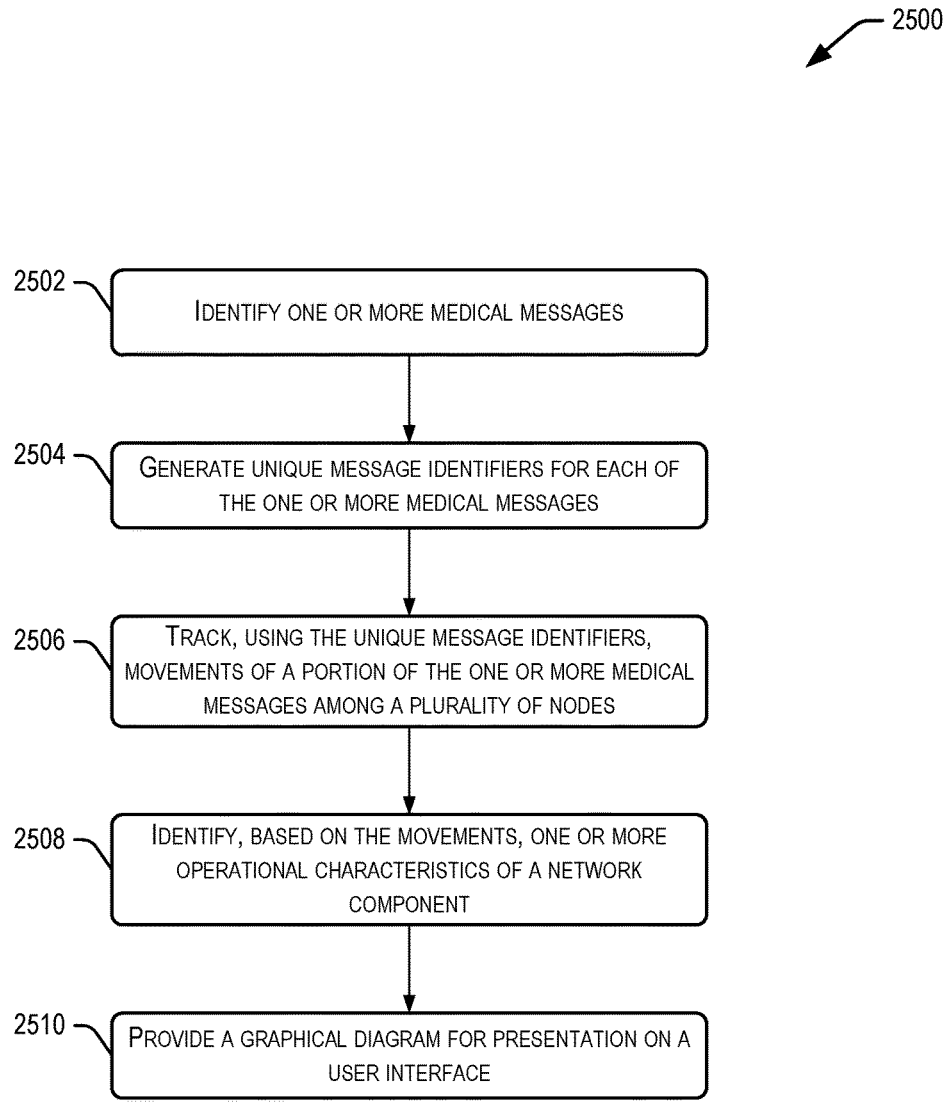
FIG. 25 is a flow diagram depicting example acts for implementing techniques relating to managing and tracking transactions within a network as described herein, according to at least one example.

FIG. 25 illustrates a flowchart of a process 2500 for providing interactive visualization of message tracking information according to an embodiment of the invention. The process 2500 begins at block 2502 by identifying one or more messages. In some examples, each of the messages is representative of a single transaction within the network. Each of the messages may originate from a respective source node of the network.

At 2504, the process 2500 generates unique message identifiers for each of the one or more messages. In some examples, each unique message identifier may be generated based at least in part on at least one of a source application identifier, a source facility identifier, a message type identifier, or a message control identifier. In some examples, the unique message identifier is a concatenation of the source application identifier, the source facility identifier, the message type identifier, and the message control identifier. In some examples, the unique message identifier represents an underlying message and is used to track the movement of the message as it moves throughout the network. In some examples, the unique message identifier represents a pointer that points to the message and enables selection and access of the message wherever it may be stored.

At 2506, the process 2500 tracks, using the unique message identifiers, movements of a portion of the one or more messages among the plurality of nodes of the network. In some examples, tracking the movements of the portion of the one or more messages includes receiving updates from nodes that receive the messages. In some examples, the nodes of the network include computer systems, components, devices, geographic regions, message types, facilities, applications, and any other suitable representation of data flow that can be tracked.

At 2508, the process 2500 identifies one or more operational characteristics of a network component to which some of the one or more messages were addressed. In some examples, identifying is based at least in part on the movements of the portion of the one or more messages.

At 2510, the process 2500 provides a graphical diagram for presentation on a user interface. In some examples, the graphical diagram depicts health of the network component in terms of the one or more operational characteristics. In some examples, the health of the network component is represented by a change in a graphical characteristic of a node that represents the network component. In some examples, the health of the network component is represented in a table or graph. In some examples, the table or graph includes details describing how the message tracking data indicates the health of the component.

Figure 26:
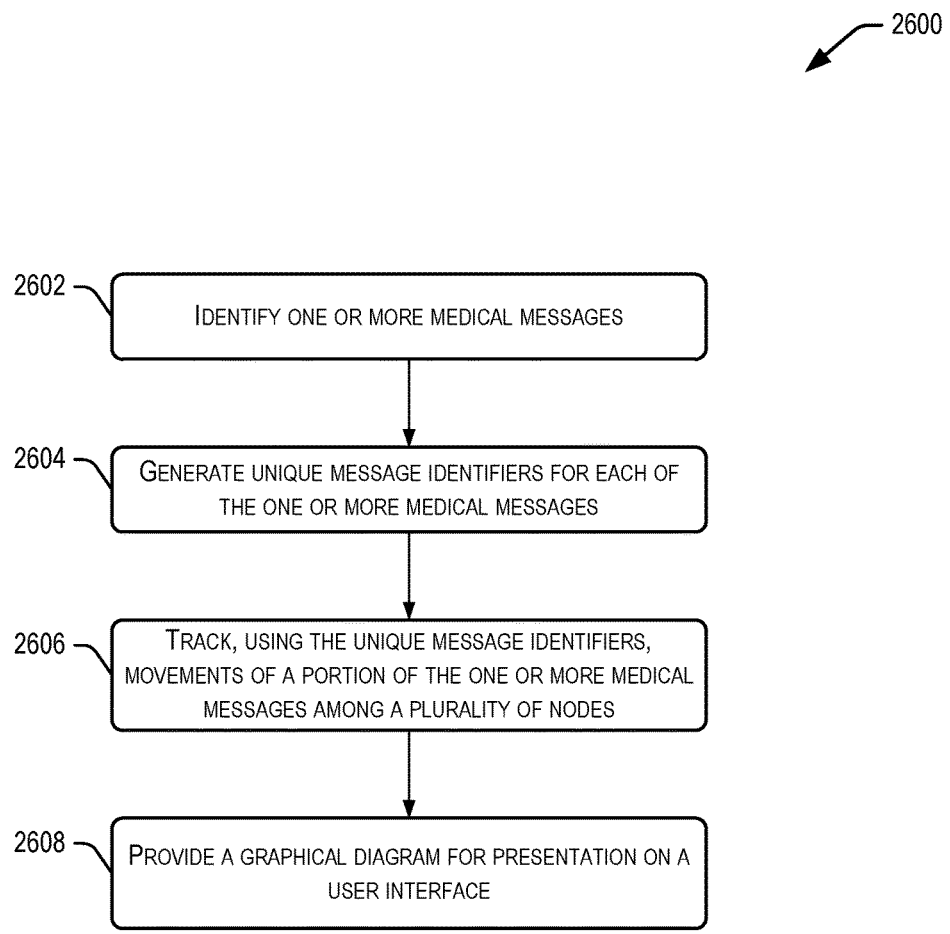
FIG. 26 is a flow diagram depicting example acts for implementing techniques relating to managing and tracking transactions within a network as described herein, according to at least one example.

FIG. 26 illustrates a flowchart of a process 2600 for providing interactive visualization of message tracking information according to an embodiment of the invention. The process 2600 begins at block 2602 by identifying one or more messages. In some examples, each of the messages is representative of a single transaction within the network. Each of the messages may originate from a respective source node of the network.

At 2604, the process 2600 generates unique message identifiers for each of the one or more messages. In some examples, each unique message identifier may be generated based at least in part on at least one of a source application identifier, a source facility identifier, a message type identifier, or a message control identifier. In some examples, the unique message identifier is a concatenation of the source application identifier, the source facility identifier, the message type identifier, and the message control identifier. In some examples, the unique message identifier represents an underlying message and is used to track the movement of the message as it moves throughout the network. In some examples, the unique message identifier represents a pointer that points to the message and enables selection and access of the message wherever it may be stored.

At 2606, the process 2600 tracks, using the unique message identifiers, movements of a portion of the one or more messages among the plurality of nodes of the network. In some examples, tracking the movements of the portion of the one or more messages includes receiving updates from nodes that receive the messages. In some examples, the nodes of the network include computer systems, components, devices, geographic regions, message types, facilities, applications, and any other suitable representation of data flow that can be tracked.

At 2608, the process 2600 provides a graphical diagram for presentation on a user interface. In some examples, the graphical diagram includes one or more major shapes and one or more minor shapes. In some examples, the one or more major shapes each represent a message type of the portion of the one or more messages that has been tracked. In some examples, the one or more minor shapes each represent a facility from which the portion of the one or more messages previously originated. In some examples, the one or more minor shapes are disposed within the one or more major shapes. In some examples, the size of each of the one or more major shapes is dependent on a quantity of messages corresponding to the message type of the respective major shape, and the size of each of the one or more minor shapes is dependent on a quantity of messages corresponding to the respective facility of the minor shape. In some examples, the formatting (e.g., color, shading, fill, etc.) of each of the minor shapes represents the percentage of errors compared to the total number of messages for the particular minor shape. In this manner, both the number of messages and the intensity of the problem are highlighted.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for reconciling medical messages within a medical network, the method comprising:

identifying, by a computer system of a transaction management platform, one or more medical messages, each medical message of the one or more medical messages being representative of a single transaction within the medical network and originating from a respective node of a plurality of nodes of the medical network;

generating, by the computer system, unique message identifiers for each of the one or more medical messages, each unique message identifier of the unique message identifiers generated based at least in part on at least one of a source application identifier, a source facility identifier, a message type identifier, or a message control identifier;

tracking, by the computer system, movements of a first medical message among the plurality of nodes of the medical network by at least:

confirming receipt of a first communication from a first node of the plurality of nodes, the first communication comprising a first unique message identifier associated with the first medical message of the one or more medical messages; and confirming receipt of a second communication from a second node of the plurality of nodes, the second communication comprising the first unique message identifier associated with the first medical message;

assigning a reconciliation status to the first medical message based at least in part on confirming receipt of the first and second communications, the reconciliation status corresponding to whether the first medical message was acknowledged by respective nodes of the plurality of nodes; and providing, for presentation on a user interface, a set of graphical diagrams comprising:

a first graphical diagram graphically depicting data flow of the one or more medical messages among the plurality of nodes of the medical network, the data flow being represented by a set of threads extending between the plurality of nodes, and a relative size of each thread of the set of threads being dependent on a characteristic of the one or more medical messages; and a second graphical diagram graphically depicting the reconciliation status of the first medical message and other reconciliation statuses of other medical messages of the one or more medical messages.

2. The computer-implemented method of claim 1, wherein the reconciliation status for a particular medical message of the one or more medical messages includes that the particular medical message was successfully received.

3. The computer-implemented method of claim 1, wherein the reconciliation status for a particular medical message of the one or more medical messages includes that the particular medical message was negatively acknowledged.

4. The computer-implemented method of claim 1, wherein the reconciliation status for a particular medical message of the one or more medical messages includes that the particular medical message was not received.

5. The computer-implemented method of claim 1, wherein the reconciliation status for a particular medical message of the one or more medical messages includes that the particular medical message is unknown.

6. The computer-implemented method of claim 1, wherein at least one of the first graphical diagram or the second graphical diagram is organized by an organization option, the organization option being a message type, a source, a data center, a network, or a facility.

7. The computer-implemented method of claim 6, wherein at least one of the first graphical diagram or the second graphical diagram includes a quantities of messages area indicating a plurality of quantities of the one or more medical messages based on the organization option.

8. The computer-implemented method of claim 6, wherein at least one of the first graphical diagram or the second graphical diagram includes a status of messages area indicating, based on the organization option, one or more of the following:
 a first number of medical messages, of the one or more medical messages, that reached their respective destination nodes;
 a second number of medical messages, of the one or more medical messages, that were not reconciled;
 a third number of medical messages, of the one or more medical messages, that were negatively acknowledged; and
 a fourth number of medical messages, of the one or more medical messages, that reconciliation from their respective source nodes is still unknown.

9. The computer-implemented method of claim 8, wherein at least one of the first graphical diagram or the second graphical diagram includes a popup within the status of messages area allowing a user to identify and download individual messages.

10. A non-transitory computer readable storage media for reconciling medical messages within a medical network, the computer readable storage media comprising instructions to cause one or more processors to perform operations comprising:
 identifying, by a computer system of a transaction management platform, one or more medical messages, each medical message of the one or more medical messages being representative of a single transaction within the medical network and originating from a respective node of the medical network, the medical network including a plurality of nodes;
 generating, by the computer system, unique message identifiers for each of the one or more medical messages, each unique message identifier of the unique message identifiers generated based at least in part on at least one of a source application identifier, a source facility identifier, a message type identifier, or a message control identifier;
 tracking, by the computer system, movements of a first medical message among the plurality of nodes of the medical network by at least:
  confirming receipt of a first communication from a first node of the plurality of nodes, the first communication comprising a first unique message identifier associated with the first medical message of the one or more medical messages; and
  confirming receipt of a second communication from a second node of the plurality of nodes, the second communication comprising the first unique message identifier associated with the first medical message;
 assigning a reconciliation status to the first medical message based at least in part on confirming receipt of the first and second communications, the reconciliation status corresponding to whether the first medical message was acknowledged by respective nodes of the plurality of nodes; and
 providing, for presentation on a user interface, a set of graphical diagrams comprising:
  a first graphical diagram graphically depicting data flow of the one or more medical messages among the plurality of nodes of the medical network, the data flow being represented by a set of threads extending between the plurality of nodes, and a relative size of each thread of the set of threads being dependent on a characteristic of the one or more medical messages; and
  a second graphical diagram graphically depicting the reconciliation status of the first medical message and other reconciliation statuses of other medical messages of the one or more medical messages.

11. The non-transitory computer readable storage media of claim 10, wherein the reconciliation status for a particular medical message of the one or more medical messages includes that the particular medical message was successfully received.

12. The non-transitory computer readable storage media of claim 10, wherein at least one of the first graphical diagram or the second graphical diagram is organized by an organization option, the organization option being a message type, a source, a data center, a network, or a facility.

13. The non-transitory computer readable storage media of claim 12, wherein at least one of the first graphical diagram or the second graphical diagram includes a quantities of messages area indicating a plurality of quantities of the one or more medical messages based on the organization option.

14. The non-transitory computer readable storage media of claim 12, wherein at least one of the first graphical diagram or the second graphical diagram includes a status of messages area indicating, based on the organization option, one or more of the following:
 a first number of medical messages, of the one or more medical messages, that reached their respective destination nodes;
 a second number of medical messages, of the one or more medical messages, that were not reconciled;
 a third number of medical messages, of the one or more medical messages, that were negatively acknowledged; and
 a fourth number of medical messages, of the one or more medical messages, that reconciliation from their respective source nodes is still unknown.

15. The non-transitory computer readable storage media of claim 14, wherein at least one of the first graphical diagram or the second graphical diagram includes a popup within the status of messages area allowing a user to identify and download individual messages.

16. A system for reconciling medical messages within a medical network, the system comprising:
one or more processors; and
one or more non-transitory computer readable storage mediums comprising instructions to cause the one or more processors to perform operations comprising:
identifying one or more medical messages, each medical message of the one or more medical messages being representative of a single transaction within the medical network and originating from a respective node of the medical network, the medical network including a plurality of nodes;
generating unique message identifiers for each of the one or more medical messages, each unique message identifier of the unique message identifiers generated based at least in part on at least one of a source application identifier, a source facility identifier, a message type identifier, or a message control identifier;
tracking movements of a first medical message among the plurality of nodes of the medical network by at least:
confirming receipt of a first communication from a first node of the plurality of nodes, the first communication comprising a first unique message identifier associated with the first medical message of the one or more medical messages; and
confirming receipt of a second communication from a second node of the plurality of nodes, the second communication comprising the first unique message identifier associated with the first medical message;
assigning a reconciliation status to the first medical message based at least in part on confirming receipt of the first and second communications, the reconciliation status corresponding to whether the first medical message was acknowledged by respective nodes of the plurality of nodes; and
providing, for presentation on a user interface, a set of graphical diagrams comprising:
a first graphical diagram graphically depicting data flow of the one or more medical messages among the plurality of nodes of the medical network, the data flow being represented by a set of threads extending between the plurality of nodes, and a relative size of each thread of the set of threads being dependent on a characteristic of the one or more medical messages; and
a second graphical diagram graphically depicting the reconciliation status of the first medical message and other reconciliation statuses of other medical messages of the one or more medical messages.

17. The system of claim 16, wherein at least one of the first graphical diagram or the second graphical diagram is organized by an organization option, the organization option being a message type, a source, a data center, a network, or a facility.

18. The system of claim 17, wherein at least one of the first graphical diagram or the second graphical diagram includes a quantities of messages area indicating a plurality of quantities of the one or more medical messages based on the organization option.

19. The system of claim 17, wherein at least one of the first graphical diagram or the second graphical diagram includes a status of medical messages area indicating, based on the organization option, one or more of the following:
a first number of medical messages, of the one or more medical messages, that reached their respective destination nodes;
a second number of medical messages, of the one or more medical messages, that were not reconciled;
a third number of medical messages, of the one or more medical messages, that were negatively acknowledged; and
a fourth number of medical messages, of the one or more medical messages, that reconciliation from their respective source nodes is still unknown.

20. The system of claim 19, wherein at least one of the first graphical diagram or the second graphical diagram includes a popup within the status of medical messages area allowing a user to identify and download individual medical messages.

* * * * *